US006541564B2

(12) United States Patent
Schmid et al.

(10) Patent No.: US 6,541,564 B2
(45) Date of Patent: Apr. 1, 2003

(54) PREPARATION OF COPOLYMERS OF CARBON MONOXIDE AND AN OLEFINICALLY UNSATURATED COMPOUND IN AN AQUEOUS MEDIUM

(75) Inventors: Markus Schmid, Deidesheim (DE); Reinhold J. Leyrer, Dannstadt (DE); Mubarik Mahmood Chowdhry, Strasbourg (FR); Marc Oliver Kristen, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/127,508

(22) Filed: Apr. 23, 2002

(65) Prior Publication Data

US 2002/0198359 A1 Dec. 26, 2002

(30) Foreign Application Priority Data

May 22, 2001 (DE) .......................................... 101 25 138

(51) Int. Cl.$^7$ .............................. C08F 2/32; C08G 2/02
(52) U.S. Cl. ....................... 524/801; 528/392; 527/300; 527/313; 527/600; 524/403; 524/404; 524/413; 524/414; 524/417; 524/432; 524/709; 524/732; 524/734; 524/798
(58) Field of Search .......................... 528/392; 527/300, 527/313, 600; 524/709, 732, 734, 798, 801, 403, 404, 413, 414, 417, 432

(56) References Cited

U.S. PATENT DOCUMENTS

| 5,358,998 A | 10/1994 | Wendel et al. |
| 5,684,080 A | 11/1997 | Van Der Heide et al. |
| 6,087,481 A | 7/2000 | Reetz et al. |

FOREIGN PATENT DOCUMENTS

| DE | 0 485 035 A2 | 5/1992 |
| DE | 196 50 790 A1 | 6/1998 |
| DE | 199 17 920 A1 | 10/2000 |
| DE | A 100 61 877 | 6/2002 |
| EP | 0 121 965 | 10/1984 |
| EP | 0 305 011 | 3/1989 |
| EP | 0 428 228 A2 | 5/1991 |
| EP | 0 460 743 A2 | 12/1991 |
| EP | 0 536 597 B1 | 4/1993 |
| EP | 0 590 942 A2 | 4/1994 |
| EP | 0 702 045 A2 | 3/1996 |
| WO | WO 99/61508 | 12/1999 |
| WO | WO 00/01756 | 1/2000 |

OTHER PUBLICATIONS

Eite Drent, et al. "Palladium–Catalyzedalternating Copolymerization of Alkenes and Carbon Monoxide," Chemical Reviews, vol. 96, No. 2 1996, pp. 663–681.

Zhaozhong Jiang, et al. "Water–Soluble Palladium(II) Compoundes as Catalysts for the Alternating Copolymerization of Olefins with Carbon Monoxide in an Aqueous Medium" Macromolecules, vol. 27 No. 24, Nov. 1994, pp. 7215–7216.

Göran Verspui, et al. Catalytic Conversions in Water. Part 9. High Activity of the Pd/dpppr–s/Brønsted acid system in the alternating copolymerization of ethene and carbon monoxide {dpppr–s=$C_3H_6$–1,3–[P($C_6H_4$–m–$SO_3Na)_2$]$_2$} Chemical Communications, No. 3, 1998, pp. 401–402.

*Primary Examiner*—Samuel A. Acquah
(74) *Attorney, Agent, or Firm*—Oblon, Spivak, McClelland, Maier & Neustadt, P.C.

(57) ABSTRACT

In a process for the metal-catalyzed preparation of copolymers of carbon monoxide and an olefinically unsaturated compound having from 2 to 20 carbon atoms in an aqueous medium, the copolymerization is carried out in the presence of a water-soluble macromolecular host compound which has a hydrophobic cavity and a hydrophilic shell.

16 Claims, No Drawings

PREPARATION OF COPOLYMERS OF CARBON MONOXIDE AND AN OLEFINICALLY UNSATURATED COMPOUND IN AN AQUEOUS MEDIUM

The present invention relates to a process for preparing copolymers of carbon monoxide and an olefinically unsaturated compound having from 2 to 20 carbon atoms in an aqueous medium, to the aqueous copolymer system and to its use.

Copolymers of carbon monoxide and olefinically unsaturated compounds, also known as carbon monoxide copolymers or polyketones for short, are known. For example, high molecular weight partially crystalline polyketones having a strictly alternating sequence of the monomers in the main chain generally display high melting points, good heat distortion resistance, good resistance to chemicals, good barrier properties toward water and air and advantageous mechanical and rheological properties.

Polyketones derived from carbon monoxide and olefins, generally α-olefins, are of industrial interest. Examples are carbon monoxide-ethene, carbon monoxide-propene, carbon monoxide-ethene-propene, carbon monoxide-ethene-1-butene, carbon monoxide-ethene-1-hexene, carbon monoxide-propene-1-butene and carbon monoxide-propene-1-hexene copolymers.

The preparation of polyketones by processes catalyzed by transition metals is known. For example, a cis-palladium complex chelated with bidentate phosphine ligands, viz. [Pd(Ph$_2$P(CH$_2$)$_3$PPh$_2$)](OAc)$_2$ (Ph=phenyl, Ac=acetyl), is used in EP-A 0 121 965. The copolymerization of carbon monoxide can be carried out in suspension, as described in EP-A 0 305 011, or in the gas phase, for example as described in EP-A 0 702 045. Frequently used suspension media are low molecular weight alcohols, in particular methanol (cf. EP-A 0 428 228), and nonpolar or polar aprotic liquids such as dichloromethane, toluene or tetrahydrofuran (cf. EP-A 0 460 743 and EP-A 0 590 942). Complexes containing chelating bisphosphine ligands whose radicals on the phosphorus are aryl or substituted aryl groups have been found to be particularly useful for the copolymerization processes mentioned. Accordingly, particularly frequently used chelating ligands are 1,3-bis(diphenylphosphino) propane and 1,3-bis[di(o-methoxyphenyl)phosphino)] propane (cf. Drent et al., Chem. Rev., 1996, 96, pp. 663 to 681). In the abovementioned cases, the carbon monoxide copolymerization is usually carried out in the presence of acids.

The carbon monoxide copolymerization in low molecular weight alcohols such as methanol suffers from the disadvantage that the carbon monoxide copolymer which is formed has a high absorption capacity for these liquids and up to 80% by volume of, for example, methanol are bound or absorbed by the carbon monoxide copolymer. As a result, a high energy input is necessary to dry the carbon monoxide copolymers and isolate them in pure form. A further disadvantage is that even after intensive drying, residual alcohol always still remains in the carbon monoxide copolymer. For this reason, molding compositions produced in this way are ruled out from the start as packaging material for food. EP-A 0 485 035 proposes the addition of water in amounts of from 2.5 to 15% by weight to the alcoholic suspension medium in order to eliminate residual low molecular weight alcohol in the carbon monoxide copolymer. However, this procedure does not lead to methanol-free copolymers either. The use of halogenated hydrocarbons or aromatics such as dichloromethane or chlorobenzene or toluene also causes problems, particularly in handling and disposal.

To circumvent the disadvantages associated with the abovementioned suspension media, Jiang and Sen, Macromolecules, 1994, 27, pp. 7215 to 7216, describe the preparation of carbon monoxide copolymers in aqueous systems using a catalyst system comprising [Pd(CH$_3$CN)$_4$] (BF$_4$)$_2$ and 1,3-bis[di(3-benzenesulfonic acid)phosphino] propane as water-soluble chelating ligand. However, the catalyst activity achieved is unsatisfactory.

Verspui et al., Chem. Commun., 1998, pp. 401 to 402, were able to increase, compared to the results of Jiang and Sen, the catalyst activity in the copolymerization of carbon monoxide and ethene by using the abovementioned chelating ligand in significantly purer form. Furthermore, the presence of a Bronsted acid is necessary to achieve the improved, compared to the results of Jiang and Sen, catalyst activities. The polyketones described in the publication, which are prepared from carbon monoxide and ethylene, have the disadvantage that their molecular weight is less than that of the comparable polyketones which have been prepared in methanol as solvent.

The patent application filed by the present applicant at the German patent and trademarks office under the application number 19917920 relates to a process for the metal-catalyzed preparation of linear, alternating copolymers of carbon monoxide and an olefinically unsaturated compound having from three to twenty carbon atoms in an aqueous medium using a specific metal catalyst system.

In the patent application likewise filed by the present applicant at the German patent and trademarks office under the application number 10061877, stable aqueous polymer dispersions are obtained using the metal catalyst system described in the abovementioned application when the polymerization of carbon monoxide and an olefinically unsaturated compound is carried out in an aqueous medium using specific comonomers.

It is an object of the present invention to improve the catalytic preparation of copolymers of carbon monoxide and an olefinically unsaturated compound having from 2 to 20 carbon atoms in an aqueous medium using the metal catalyst system described in the two abovementioned applications.

We have found that this object is achieved by a process for preparing copolymers of carbon monoxide and an olefinically unsaturated compound having from 2 to 20 carbon atoms in an aqueous medium, in which the copolymerization of carbon monoxide and the olefinically unsaturated compound is carried out in an aqueous medium in the presence of a1) metal complexes of the formula (I)

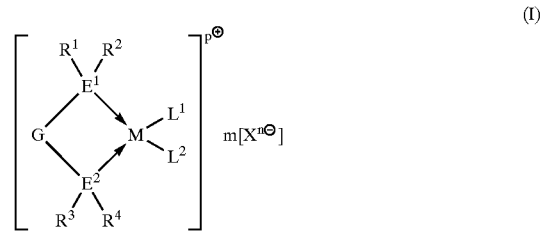

where the substituents and indices have the following meanings:

G is a 5-, 6- or 7-membered carbocyclic ring system without heteroatoms or containing one or more heteroatoms, —(CR$^b_2$)r—, —(CR$^b_2$)$_s$—Si(R$^a$)$_2$—(CR$^b_2$)$_t$—, —A—O—B— or —A—Z(R$^5$)—B—, where R$^5$ is hydrogen, C$_1$–C$_{20}$-alkyl, C$_3$–C$_{14}$-cycloalkyl, C$_6$–C$_{14}$-aryl or alkylaryl having from 1 to 20 carbon atoms in the alkyl part and from 6 to 14 carbon atoms in the aryl part, each of which may be unsubstituted or substituted by functional groups containing atoms of groups IVA, VA, VIA or VIIA of the Periodic Table of the Elements, or is —N($R^b$)$_2$, —Si($R^c$)$_3$ or a radical of the formula (II)

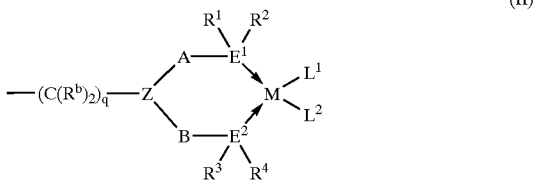

where
q is an integer from 0 to 20 and the further substituents in formula (II) are as defined for formula (I),
A, B are each —(C$R^b{}_2$)$_{r'}$—, —(C$R^b{}_2$)$_s$—Si($R^{a)}{}_2$—(C$R^b{}_2$)$_t$—, —N($R^b$)—, an r'—, s- or t-atomic constituent of a ring system or together with Z form an (r'+1)-, (s+1)- or (t+1)-atomic constituent of a heterocycle,
$R^a$ are each, independently of one another, linear or branched $C_1$–$C_{20}$-alkyl, $C_3$–$C_{14}$-cycloalkyl, $C_6$–$C_{14}$-aryl or alkylaryl having from 1 to 20 carbon atoms in the alkyl part and from 6 to 14 carbon atoms in the aryl part, where the specified radicals may also be substituted,
$R^b$ is as defined for $R^a$, and may also be hydrogen or —Si ($R^c$)$_3$,
$R^c$ are each, independently of one another, linear or branched $C_1$–$C_{20}$-alkyl, $C_3$–$C_{14}$-cycloalkyl, $C_6$–$C_{14}$-aryl or alkylaryl having from 1 to 20 carbon atoms in the alkyl part and from 6 to 14 carbon atoms in the aryl part, where the specified radicals may also be substituted,
r is 1, 2, 3 or 4 and
r' is 1 or 2,
s, t are each 0, 1 or 2, where 1≦s+t≦3,
Z is a nonmetallic element of group VA of the Periodic Table of the Elements,
M is a metal selected from groups VIIIB, IB and IIB of the Periodic Table of the Elements,
$E^1$, $E^2$ are each a nonmetallic element from group VA of the Periodic Table of the Elements,
$R^1$ to $R^4$ are each, independently of one another, linear or branched $C_2$–$C_{20}$-alkyl, $C_3$–$C_{14}$-cycloalkyl, $C_6$–$C_{14}$-aryl or alkylaryl having from 1 to 20 carbon atoms in the alkyl part and from 6 to 14 carbon atoms in the aryl part, where at least one of the radicals $R^1$ to $R^4$ bears at least one hydroxy, amino or acid group or contains an ionic functional group,
$L^1$, $L^2$ are formally charged or uncharged ligands,
X are formally monovalent or polyvalent anions,
p is 0, 1, 2, 3 or 4,
m, n are each 0, 1, 2, 3 or 4,
where p=m×n,
b) a dispersant and
c) optionally an organic hydroxy compound,
wherein the copolymerization is carried out in the presence of a water-soluble macromolecular host compound which has a hydrophobic cavity and a hydrophilic shell.

In addition, the invention provides a process in which the metal complex a1) is not present in the form of a defined compound but is instead formed in-situ from the individual components before and/or during the copolymerization.

The invention furthermore provides a process for preparing copolymers of carbon monoxide and at least one olefinically unsaturated compound in an aqueous medium, in which an acid and optionally a hydroxy compound c) are used in addition to the abovementioned components a1) and b) or a1.1), a1.2) and b).

The invention also provides the aqueous copolymer systems prepared by the process and provides for their use.

Polymerization reactions using water-soluble macromolecular host compounds which have a hydrophobic cavity and a hydrophilic shell have already been described in the prior art (see, for example, DE-A 19650790, EP-A 536597 and U.S. Pat. No. 5,358,998 and the literature cited therein). These are aqueous emulsion polymerizations of acrylate monomers using free-radical initiators. However, nothing is said to suggest that these water-soluble macromolecular host compounds have an advantageous effect on the polymerization rate or the polymerization conversion in the catalytic copolymerization of olefinically unsaturated compounds with carbon monoxide in an aqueous medium.

The nomenclature used for designating the groups of the Periodic Table of the Elements is that used by the Chemical Abstracts Service up to 1986 (thus, for example, group VA comprises the elements N, P, As, Sb, Bi; group IB comprises Cu, Ag, Au).

In a preferred embodiment of the process of the present invention, the copolymerization is carried out in the presence of a1) a water-soluble metal complex of the formula (Ia)

where the substituents and indices have the following meanings:
G is —(C$R^b{}_2$)$_r$— or —(C$R^b{}_2$)—N($R^5$)—(C$R^b{}_2$)—, where
$R^b$ is hydrogen, $C_1$–$C_{10}$-alkyl or $C_6$–$C_{10}$-aryl,
r is 1, 2, 3 or 4,
$R^5$ is hydrogen or linear or branched $C_1$–$C_{10}$-alkyl, $C_3$–$C_{10}$-cycloalkyl or $C_6$–$C_{14}$-aryl, bearing functional groups which contain atoms of groups IVA, VA, VIA or VIIA of the Periodic Table of the Elements,
M is palladium or nickel,
$E^1$, $E^2$ are each phosphorus,
$R^1$ to $R^4$ are each linear, branched or carbocycle-containing $C_2$–$C_{20}$-alkyl units, $C_3$–$C_{14}$-cycloalkyl units, $C_6$–$C_{14}$-aryl units or alkylaryl groups having from 1 to 20 carbon atoms in the alkyl part and from 6 to 14 carbon atoms in the aryl part, where at least one of the radicals $R^1$ to $R^4$ bears at least one hydroxy, amino, carboxylic acid, phosphoric acid, ammonium or sulfonic acid group present in a terminal position, internal position or as substituent,
$L^1$, $L^2$ are each acetate, trifluoroacetate, tosylate or halide, a2) sulfuric acid, p-toluenesulfonic acid, tetrafluoroboric acid, trifluoromethanesulfonic acid, perchloric acid or trifluoroacetic acid as protic acid or boron trifluoride, antimony pentafluoride or a triarylborane as Lewis acid, b) an anionic, cationic and/or nonionic emulsifier and c) a monohydric and/or polyhydric alcohol and/or a sugar.

In a further embodiment, preference is given to a process in which at least one of the substituents $R^1$ to $R^4$ in the metal complex a1) is $C_2$–$C_{20}$-alkyl, $C_3$–$C_{14}$-cycloalkyl, $C_6$–$C_{14}$-aryl or alkylaryl having from 1 to 20 carbon atoms in the alkyl part and from 6 to 14 carbon atoms in the aryl part which is in each case substituted by at least one free carboxylic acid or sulfonic acid group, and the presence of external acids a2) is completely dispensed with.

In a further process according to the present invention, the metal complex a1) is not prepared beforehand and used in defined form in the copolymerization, but is instead generated in-situ by addition of the metal component a1.1) and the chelating ligand a1.2) to the starting materials for the copolymerization.

As constituent of the metal complexes a1) or as chelating ligand a1.2) in the process of the present invention, it is in principle possible to use bidentate chelating ligands of the formula $(R^1)(R^2)E^1$—G—$E^2(R^3)(R^4)$ (III), where the substituents and indices are as defined above.

The bridging structural unit G in the metal complexes a1) or the chelating ligands a1.2) of the process of the present invention generally consists of monoatomic or polyatomic bridge segments. For the purposes of the present invention, a bridging structural unit is basically a group which connects the elements $E^1$ and $E^2$ to one another. Such structural units include, for example, substituted or unsubstituted alkylene chains or alkylene chains in which an alkylene unit has been replaced by a silylene group, an amino or phosphino group or by an ether oxygen.

The bridging structural unit G can also be a 5-, 6- or 7-membered carbocyclic ring system without heteroatoms or containing one or more heteroatoms. The ring system can be aliphatic or aromatic. Preference is given to 5- or 6-membered ring systems containing 0, 1 or 2 heteroatoms selected from among N, O and S.

The bonds to the atoms $E^1$ and $E^2$ can occupy any desired positions relative to one another. Preferred relative positions are the 1,2, 1,3 and 1,4 positions.

Preferred embodiments of cyclic structural units G are the following (bonding positions to $E^1$ and $E^2$ are indicated):

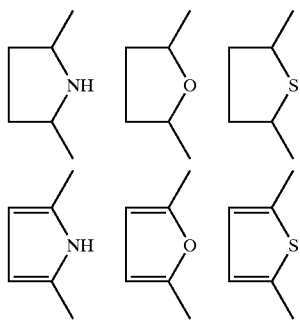

-continued

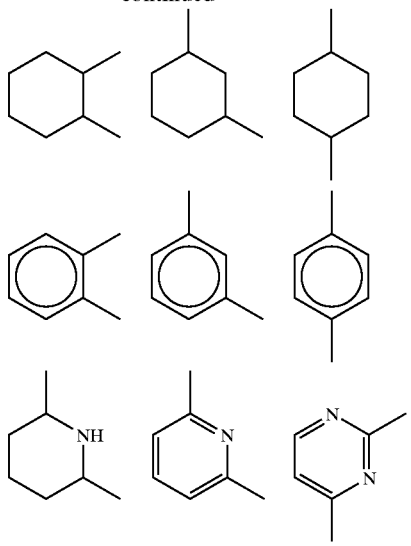

Among monoatomic bridging structural units, preference is given to those having a bridging atom from group IVA of the Periodic Table of the Elements, for example —$C(R^b)_2$— or —$Si(R^a)_2$—, where $R^a$ are each, independently of one another, particularly linear or branched $C_1$–$C_{10}$-alkyl, for example methyl, ethyl, i-propyl or t-butyl, $C_3$–$C_6$-cycloalkyl, such as cyclopropyl or cyclohexyl, $C_6$–$C_{10}$-aryl, such as phenyl or naphthyl, $C_6$–$C_{10}$-aryl substituted by functional groups containing nonmetallic elements of groups IVA, VA, VIA or VIIA of the Periodic Table of the Elements, for example tolyl, (trifluoromethyl)phenyl, dimethylaminophenyl, p-methoxyphenyl or partially halogenated or perhalogenated phenyl, aralkyl having from 1 to 6 carbon atoms in the alkyl part and from 6 to 10 carbon atoms in the aryl part, for example benzyl, and $R^b$ is particularly preferably hydrogen and may also be as defined above for $R^a$. $R^a$ is, in particular, a methyl group, and $R^b$ is in particular hydrogen.

Among multiatomic bridging systems, particular mention may be made of diatomic, triatomic and tetraatomic bridging structural units, the preference generally being given to using the triatomic bridging systems.

Suitable triatomic bridging structural units are generally based on a chain of carbon atoms, i.e., for example, propylene (—$CH_2CH_2CH_2$—), or a bridging unit containing a heteroatom from group IVA, VA or VIA of the Periodic Table of the Elements, e.g. silicon, nitrogen, phosphorus or oxygen, in the chain framework.

The bridging carbon atoms can in general be substituted by $C_1$–$C_6$-alkyl such as methyl, ethyl or t-butyl, $C_6$–$C_{10}$-aryl such as phenyl or by functional groups containing elements of groups IVA, VA, VIA or VIIA of the Periodic Table of the Elements, i.e., for example, triorganosilyl, dialkylamino, alkoxy, hydroxy or halogen. Suitable substituted propylene bridges are, for example, those having a methyl, phenyl, hydroxyl, trifluoromethyl, ω-hydroxyalkyl or methoxy group in the 2 position.

Among multiatomic bridging structural units having a heteroatom in the chain framework, it is advantageous to use compounds in which Z is nitrogen or phosphorus, in particular nitrogen (cf. formula (I)). The substituent $R^5$ on Z can be, in particular: hydrogen, linear or branched $C_1$–$C_{20}$-alkyl, in particular $C_1$–$C_{18}$-alkyl such as methyl, ethyl, i-propyl, t-butyl, n-hexyl or n-dodecyl, $C_3$–$C_{14}$-cycloalkyl, in particular $C_3$–$C_8$-cycloalkyl such as cyclopropyl or cyclohexyl, $C_6$–$C_{14}$-aryl, in particular $C_6$–$C_{10}$-aryl, for example phenyl, or alkylaryl having from 1 to 20 carbon atoms in the alkyl part and from 6 to 10 carbon atoms in the aryl part, for example benzyl.

The alkyl and aryl radicals mentioned may be unsubstituted or substituted. Examples of possible substituents are functional groups containing atoms of groups IVA, VA, VIA or VIIA of the Periodic Table of the Elements. Suitable functional groups are, inter alia, triorganosilyl groups such as trimethylsilyl or t-butyldiphenylsilyl, the carboxylic acid group or carboxylic acid derivatives such as esters or amides, primary, secondary or tertiary amino groups such as dimethyl or methylphenylamino, the nitro and hydroxy groups, also alkoxy radicals such as methoxy or ethoxy, the sulfonate group and halogen atoms such as fluorine, chlorine or bromine. For the purposes of the present invention, aryl also encompasses substituted and unsubstituted heteroaryl, for example pyridyl or pyrrolyl. Alkyl radicals $R^5$ likewise include long-chain alkylene groups which have from 12 to 20 carbon atoms in the chain and may also bear functionalities such as a sulfonic acid, carboxylic acid, phosphoric acid, hydroxy, amino or ammonium group, for example in a terminal position, and also radicals of the formula (IV)

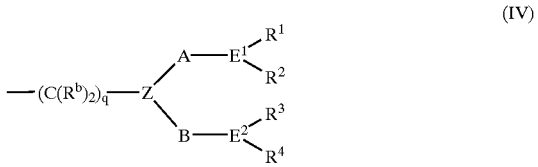

(IV)

where q is an integer from 0 to 20 and the further substituents in formula (IV) are as defined for formula (II).

Preferred radicals $R^5$ also include compounds which act as an electron-withdrawing substituent. Suitable electron-withdrawing substituents are, for example, alkyl groups having one or more electron-withdrawing radicals such as fluorine, chlorine, nitrile or nitro in the α or β position relative to Z. Also suitable are aryl groups bearing the electron-withdrawing radicals mentioned and radicals bound directly to Z, including the nitrile, sulfonate and nitro groups. Examples of suitable electron-withdrawing alkyl radicals are the trifluoromethyl, trichloroethyl, difluoromethyl, 2,2,2-trifluoroethyl, nitromethyl and cyanomethyl groups. Examples of suitable electron-withdrawing aryl radicals are: m-, p-, o-fluorophenyl or -chlorophenyl, 2,4-difluorophenyl, 2,4-dichlorophenyl, 2,4, 6-trifluorophenyl, 3,5-bis(trifluoromethyl)phenyl, nitrophenyl, 2-chloro-5-nitrophenyl and 2-bromo-5-nitrophenyl. In this context, carbonyl units are likewise possible as radicals $R^5$, so that, when Z is nitrogen, Z and $R^5$ form a carboxamide function. Examples of suitable radicals of this type are the acetyl group and the trifluoroacetyl group.

Among the radicals $R^5$, particular preference is given to t-butyl, phenyl, p-fluorophenyl, trifluoromethyl, 2,2,2-trifluoroethyl, pentafluorophenyl, 3,5-bis(trifluoromethyl) phenyl and ortho-, e.g. 3,4-, meta-, e.g. 2,4-, or para-, e.g. 2,5-difluorophenyl.

Possible units A and B in the formulae (II) and (IV) are $C_1$–$C_4$-alkylene units in substituted or unsubstituted form, i.e., for example, methylene, ethylene, propylene or ethylidene, propylidene and benzylidene. Preference is given to using methylene, ethylene, ethylidene or benzylidene, particularly preferably methylene.

A and B can likewise each be a monoatomic, diatomic, triatomic or tetraatomic constituent of an aliphatic or aromatic ring system. For example, A and B can each be a methylene or ethylene unit of a cyclopropyl, cyclopentyl or cyclohexyl ring. Aliphatic and aromatic heterocycles are also possible as ring systems.

Furthermore, A and B can each be a constituent of a heterocycle formed by the components A—Z($R^5$)—B, A—Z—$R^5$ or B—Z—$R^5$. A—Z—$R^5$ or B—Z—$R^5$ may, for example, form a substituted or unsubstituted pyrrolidine or piperidine ring.

Possible chelating atoms $E^1$ and $E^2$ are, independently of one another, nonmetallic elements of group VA of the Periodic Table of the Elements, preferably nitrogen or phosphorus, in particular phosphorus. In a preferred embodiment, $E^1$ and $E^2$ in the compounds of the formulae (I) and (II) and (III) and (IV) are each phosphorus.

In the process of the present invention, the radicals $R^1$ to $R^4$ are each substituted $C_2$–$C_{20}$-alkyl, preferably $C_3$–$C_{18}$-alkyl, $C_3$–$C_{14}$-cycloalkyl, preferably $C_3$–$C_8$-cycloalkyl, $C_6$–$C_{14}$-aryl, preferably $C_6$–$C_{10}$-aryl, or alkylaryl having from 1 to 20, preferably from 3 to 18, carbon atoms in the alkyl part and from 6 to 14, preferably from 6 to 10, carbon atoms in the aryl part, where at least one, preferably more than one, particularly preferably all, of the radicals $R^1$ to $R^4$ bear at least one hydroxy, amino or acid group or contain an ionic functional group. Ionic functional groups are groups based on nonmetallic elements of groups IVA to VIA of the Periodic Table of the Elements, e.g. sulfonate, phosphate, ammonium, carboxylate. $R^1$ to $R^4$ are preferably linear, branched or carbocycle-containing $C_2$–$C_{20}$-alkyl units or $C_3$–$C_{14}$-cycloalkyl units, or $C_6$–$C_{14}$-aryl units or alkylaryl groups having from 1 to 20 carbon atoms in the alkyl part and from 6 to 14 carbon atoms in the aryl part, with at least one, preferably more than one, particularly preferably all, of the radicals containing at least one hydroxy, carboxylic acid, phosphoric acid, ammonium, amino or sulfonic acid group.

It is also possible to use the salts of the carboxylic, phosphoric or sulfonic acids. Examples of suitable salts are ammonium, alkylammonium, arylammonium, alkali metal or alkaline earth metal salts, e.g. sodium, potassium or magnesium carboxylates or sulfonates.

Suitable counterions for the abovementioned ammonium radicals are, in particular, nonnucleophilic anions as are also used for the metal complexes a1) (see anions X). Particularly suitable anions are, for example, sulfate, nitrate, acetate, p-toluenesulfonate, tetrafluoroborate, trifluoroacetate, trichloroacetate, hexafluorophosphate, hexafluoroantimonate and tetraarylborates.

Particularly suitable aryl radicals $R^1$ to $R^4$ are, for example, aryl units which contain no heteroatoms or have one or more, e.g. from 1 to 3, heteroatoms in the ring and are substituted by one or two hydroxy, carboxylic acid, sulfonic acid or amino groups. Among aryl and arylene radicals $R^1$ to $R^4$, preference is given to the phenyl(ene) radical. Furthermore, the radicals $R^1$ to $R^4$ may also have more than two polar groups and bear, for example, four or six hydroxy, ammonium or carboxylic acid groups. Preferred cycloaliphatic radicals $R^1$ to $R^4$ are the cyclopentyl and cyclohexyl radicals. Particularly suitable alkyl radicals $R^1$ to $R^4$ also include, for example, alkylene units bearing one or two terminal hydroxy, carboxylic acid, sulfonic acid or ammonium groups. In these cases, too, the radicals $R^1$ to $R^4$ can have more than two polar groups and, for example, bear four or six hydroxy, ammonium or carboxylic acid groups. Accordingly, it is also possible for each of the radicals $R^1$ to $R^4$ to bear different functional groups. The radicals $R^1$ to $R^4$ can also have different numbers of functional groups. Examples of suitable functional groups are the hydroxy, amino, carboxylic acid, phosphoric acid, ammonium and sulfonic acid groups.

The preparation of suitable propylene-bridged chelating ligands can, for example, be carried out starting from the commercially available 1,3-dibromopropane. This is subjected to a double Arbuzov reaction, for example using triethyl phosphite, to produce 1,3-bisphosphonic acid derivatives which can be converted by reduction as described in "Methoden der organischen Chemie (Houben-Weyl)", 4th edition, volume XII/1, part 1, Georg Thieme Verlag, 1963, p. 62, into 1,3-diphosphinopropane. By means of a hydrophosphination reaction with functionalized olefins, 1,3-diphosphinopropane offers a flexible route to substituted bisphosphines. The hydrophosphination generally proceeds via a free-radical mechanism and can be initiated thermally, photochemically or by means of a free-radical initiator. Thermal initiation generally requires temperatures in the range from 20 to 100° C. and pressures of from 0.1 to 5 bar. Suitable free-radical initiators are, for example, di-t-butyl peroxide or azobis[isobutyronitrile]. In the case of photochemical initiation, irradiation with UV radiation from a high-pressure Hg lamp for from 2 to 48 hours is generally sufficient for quantitative hydrophosphination. Free-radically initiated methods generally give anti-Markovnikov products in the hydrophosphination.

For the preparation of chelating ligands containing radicals $R^1$ to $R^4$ which bear carboxylic acid groups, it has been found to be advantageous to start from olefinically unsaturated compounds which have been converted into the corresponding carboxylic ester derivatives and to use these in the hydrophosphination reaction. The free carboxylic acids can subsequently be obtained by means of saponification according to known methods.

Suitable chelating ligands can also be prepared under acid-catalyzed conditions. The products obtained by this method are frequently obtained as a mixture due to isomerization of the olefinic double bond under the acidic reaction conditions. The process step of hydrophosphination is described, for example, in "Methoden der organischen Chemie (Houben-Weyl)", 4th edition, volume XII/1, part 1, Georg Thieme Verlag, 1963, pp. 25 to 28.

In general, the abovementioned hydrophosphination reaction can be carried out using any olefins which come into this class of compounds as long as they have appropriate functional groups, for example hydroxy, amino, carboxylic acid, phosphoric acid, ammonium and sulfonic acid groups. Possible olefinically unsaturated compounds are, for example, propenyl compounds and $C_4$–$C_{20}$-alkenes which have at least one internal or terminal double bond and bear at least one hydroxy, amino, carboxylic acid, phosphoric acid, ammonium or sulfonic acid group. Likewise suitable are olefinic compounds containing aromatic radicals, in which case the functional group can be either on an aliphatic radical or on an aromatic radical, i.e., for example, 4-(1-pentenyl)benzoic acid or 3-phenylpent-5-enecarboxylic acid. Olefinic compounds having aliphatic carbocycles as substituents in the alkylene chain are also suitable. Furthermore, it is also possible to use cyclic olefins such as cyclohexen-3-ol or cycloocten-4-ol. Of course, recourse can also be made to olefins having a plurality of functional groups selected from among hydroxy, amino, carboxylic acid, phosphoric acid, ammonium and sulfonic acid groups. The hydrophosphination reaction of the $(\alpha,\omega)$-bisphosphines is preferably carried out using suitable alkenes having an α-olefinic double bond. Examples of such alkenes include heteroatom-containing α-olefins, e.g. esters or amides of (meth)acrylic acid and also homoallyl or allyl alcohols.

In the case of aromatic radicals $R^1$ to $R^4$, chelating ligands containing sulfonic acid groups can be prepared by reacting chelating ligands which do not contain sulfonic acid groups with sulfur trioxide, chlorosulfonic acid, fuming sulfuric acid or oleum, as described in Jiang et al., Macromolecules 27 (1994) pp. 7215 to 7216 or Verspui et al., Chem. Commun., 1998, pp. 401 to 402, or in J. March "Advanced Organic Chemistry", John Wiley & Sons (NY), 1985, $3^{rd}$ Edition, pp. 473 to 475.

Further syntheses of chelating ligands containing aromatic radicals $R^1$ to $R^4$ are described in:

"Phosphorus—An outline of its Chemistry, Biochemistry and Technical Chemistry" D.E.C. Corbridge, Elsevier (Amsterdam, Tokyo, New York) 1990, 4th Edition, Chapter 8, and references cited therein, S. O. Grim, R. C. Barth, J. of Organomet. Chem. 94, 1975, p. 327

WO98/22482.

Particular preference is given to radicals $R^1$ to $R^4$ in which the hydrophilicity induced by functional groups, for example hydroxy, amino, carboxylic acid, phosphoric acid, ammonium or sulfonic acid groups, is sufficient to make the metal complex a1) completely soluble in water. The larger the number of functional groups on the radicals $R^1$ to $R^4$, the larger can the lipophilic aliphatic, aromatic or aliphatic-aromatic component be. For example, preferred radicals $R^1$ to $R^4$ each having one hydroxy group are those having from 2 to 15 carbon atoms in the alkyl unit or from 6 to 14 carbon atoms in the aryl unit.

In a particularly preferred embodiment of the chelating ligand, the radicals $R^1$ to $R^4$ as aryl substituents bearing one hydroxy group have from 6 to 14, in particular from 6 to 10, carbon atoms, as aryl substituents bearing one carboxylic acid group they have from 6 to 14, in particular from 6 to 10, carbon atoms, as aryl substituents bearing one sulfonic acid group they have from 6 to 14 carbon atoms and as aryl substituents bearing one ammonium group they have from 6 to 14 carbon atoms.

Examples of suitable chelating ligands are 1,3-bis[di(hydroxyphenyl)phosphino]propane, 1,3-bis[di(benzenesulfonic acid)phosphino]propane, preferably as the meta isomer, and its salts, 1,3-bis[di(carboxyphenyl)phosphino]propane and its salts, 1,3-bis[di(o-methoxyhydroxyphenyl)phosphino]propane, 1,3-bis[di(4-(benzenesulfonic acid)butyl)phosphino] propane, Na salt, 1,3-bis[di(5-(benzenesulfonic acid)pentyl)phosphino] propane, Na salt.

Among the abovementioned chelating ligands, particular preference is given to those in which the radicals $R^1$ to $R^4$ are each a phenyl radical substituted by one or more, e.g. from 1 to 3, hydroxy, sulfonic acid or carboxylic acid groups.

In a particularly preferred embodiment of the chelating ligand, the radicals $R^1$ to $R^4$ as alkyl substituents bearing one hydroxy group have from 4 to 12, in particular from 4 to 7, carbon atoms, as alkyl substituents bearing one carboxylic acid group they have from 4 to 15, in particular from 5 to 12, carbon atoms, as alkyl substituents bearing one sulfonic acid group they have from 4 to 18, in particular from 5 to 15, carbon atoms and as alkyl substituents bearing one ammonium group they have from 4 to 20, in particular from 5 to 18, carbon atoms.

Suitable chelating ligands are, for example, 1,3-bis[di(4-hydroxybutyl)phosphino]propane, 1,3-bis[di(5-hydroxypentyl)phosphino]propane,
1,3-bis[di(6-hydroxyhexyl)phosphino]propane,
1,3-bis[di(7-hydroxyheptyl)phosphino]propane,
1,3-bis[di(8-hydroxyoctyl)phosphino]propane,
1,3-bis{di[(3-hydroxycyclopentyl)propyl]phosphino}propane,
1,3-bis[di(5-sulfonatopentyl)phosphino]propane,
1,3-bis[di(6-sulfonatohexyl)phosphino]propane,
1,3-bis[di(7-sulfonatoheptyl)phosphino]propane,
1,3-bis[di(8-sulfonatooctyl)phosphino]propane,
1,3-bis{di[(3-sulfonatocyclopentyl)propyl]phosphino}propane,
1,3-bis[di(5-carboxypentyl)phosphino]propane,
1,3-bis[di(propylmalonic acid)phosphino]propane,
1,3-bis[di(6-carboxyhexyl)phosphino]propane,
1,3-bis[di(7-carboxyheptyl)phosphino]propane,
1,3-bis[di(8-carboxyoctyl)phosphino]propane,
N,N-bis[di(4-hydroxybutyl)phosphinomethyl]phenylamine,
N,N-bis[di(5-hydroxypentyl)phosphinomethyl]phenylamine,
N,N-bis[di(6-hydroxyhexyl)phosphinomethyl]phenylamine,
N,N-bis[di(7-hydroxyheptyl)phosphinomethyl]phenylamine,
N,N-bis[di(8-hydroxyoctyl)phosphinomethyl]phenylamine,
N,N-bis{di[(3-hydroxycyclopentyl)propyl]phosphinomethyl}-phenylamine,
N,N-bis[di(5-sulfonatopentyl)phosphinomethyl]phenylamine,
N,N-bis[di(6-sulfonatohexyl)phosphinomethyl]phenylamine,
N,N-bis[di(7-sulfonatoheptyl)phosphinomethyl]phenylamine,
N,N-bis[di(8-sulfonatooctyl)phosphinomethyl]phenylamine,
N,N-bis{di[(3-sulfonatocyclopentyl)propyl]phosphinomethyl}-phenylamine,
N,N-bis[di(5-carboxypentyl)phosphinomethyl]phenylamin
N,N-bis[di(6-carboxyhexyl)phosphinomethyl]phenylamine,
N,N-bis[di(7-carboxyheptyl)phosphinomethyl]phenylamine,
N,N-bis[di(8-carboxyoctyl)phosphinomethyl]phenylamine and
1,3-bis[di(4-methylol-5-hydroxyisopentyl)phosphino]propane.

Among the chelating ligands mentioned, particular preference is given to those in which the radicals $R^1$ to $R^4$ are each a hexyl, 4-methylpentyl, octyl, cyclopentyl or cyclohexyl radical substituted by a hydroxy or carboxylic acid group.

Suitable metals M in the process of the present invention are the metals of groups VIIIB, IB and IIB of the Periodic Table of the Elements, i.e. iron, cobalt and nickel as well as, in particular, the platinum metals such as ruthenium, rhodium, osmium, iridium and platinum and very particularly preferably palladium. In the complexes of the formula (I), the metals can be formally uncharged, formally singly positively charged or preferably formally doubly positively charged.

Suitable formally charged anionic ligands $L^1$, $L^2$ are hydride, halides, sulfates, phosphates or nitrates. Also suitable are carboxylates or salts of organic sulfonic acids such as methylsulfonate, trifluoromethylsulfonate or p-toluenesulfonate. Among the salts of organic sulfonic acids, p-toluenesulfonate is preferred. As formally charged ligands $L^1$, $L^2$, preference is given to carboxylates, preferably $C_1$–$C_{20}$-carboxylates and in particular $C_1$–$C_7$-carboxylates, e.g. acetate, trifluoroacetate, propionate, oxalate, citrate or benzoate. Particular preference is given to acetate.

Suitable formally charged organic ligands $L^1$, $L^2$ also include $C_1$–$C_{20}$-aliphatic radicals, $C_3$–$C_{14}$-cycloaliphatic radicals, $C_7$–$C_{20}$-arylalkyl radicals comprising $C_6$–$C_{14}$-aryl radicals and $C_1$–$C_6$-alkyl radicals, and also $C_6$–$C_{14}$-aromatic radicals, for example methyl, ethyl, propyl, i-propyl, t-butyl, n-, i-pentyl, cyclohexyl, benzyl, phenyl and phenyl radicals bearing aliphatic or aromatic substituents.

Suitable formally uncharged ligands $L^1$, $L^2$ are Lewis bases in general, i.e. compounds having at least one free electron pair. Particularly well-suited Lewis bases are those whose free electron pair or free electron pairs is/are located on a nitrogen or oxygen atom, i.e., for example nitriles, R—CN, ketones, ethers, alcohols or water. Preference is given to using $C_1$–$C_{10}$-nitriles such as acetonitrile, propionitrile, benzonitrile or $C_2$–$C_{10}$-ketones such as acetone, acetylacetone or else $C_2$–$C_{10}$-ethers such as dimethyl ether, diethyl ether, tetrahydrofuran. Particular preference is given to using acetonitrile, tetrahydrofuran or water.

The ligands $L^1$ and $L^2$ can in principle be present in any ligand combination, i.e. the metal complex (I) can contain, for example, a nitrate group and an acetate group, a p-toluenesulfonate group and an acetate group or a nitrate group and a formally charged organic ligand such as methyl. The ligands $L^1$ and $L^2$ are preferably identical in each of the metal complexes.

Depending on the formal charge on the fragment of the complex containing the metal M, the metal complexes may contain anions X. If the M-containing fragment of the complex is formally uncharged, the complex of the present invention of the formula (I) does not contain an anion X. It is advantageous to use anions X which have a very low nucleophilicity, i.e. have a very low tendency to undergo a strong interaction, either ionic, coordinative or covalent, with the central metal M.

Examples of suitable anions X are perchlorate, sulfate, phosphate, nitrate and carboxylates, for example acetate, trifluoroacetate, trichloroacetate, propionate, oxalate, citrate, benzoate, and also conjugate anions of organic sulfonic acids, for example methylsulfonate, trifluoromethylsulfonate and p-toluenesulfonate, also tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate. Preference is given to using perchlorate, trifluoroacetate, sulfonates such as methylsulfonate, trifluoromethylsulfonate, p-toluenesulfonate, tetrafluoroborate or hexafluorophosphate, in particular trifluoromethylsulfonate, trifluoroacetate, perchlorate or p-toluenesulfonate.

Examples of defined metal complexes are the following palladium(II) acetate complexes:

[1,3-bis(di(hydroxyphenyl)phosphino)propane]palladium(II) acetate,
[1,3-bis(di(4-hydroxybutyl)phosphino)propane]palladium(II) acetate,
[1,3-bis(di(4-methylol-5-hydroxypentyl)phosphino)propane]-palladium(II) acetate,

[1,3-bis(di(5-hydroxypentyl)phosphino)propane] palladium(II) acetate,
[1,3-bis(di(6-hydroxyhexyl)phosphino)propane] palladium(II) acetate,
[1,3-bis(di((3-hydroxycyclopentyl)propyl)phosphino) propane]-palladium(II) acetate,
[1,3-bis(di(8-hydroxyoctyl)phosphino)propane] palladium(II) acetate,
[1,3-bis(di(3-hydroxycyclohexyl)propyl)phosphino) propane]-palladium(II) acetate,
[1,3-bis(di(sulfonatophenyl)phosphino)propane] palladium(II) acetate,
[1,3-bis(di(4-sulfonatobutyl)phosphino)propane] palladium(II) acetate,
[1,3-bis(di(4-methylol-5-sulfonatopentyl)phosphino) propane]-palladium(II) acetate,
[1,3-bis(di(5-sulfonatopentyl)phosphino)propane] palladium(II) acetate,
[1,3-bis(di(6-sulfonatohexyl)phosphino)propane] palladium(II) acetate,
[1,3-bis(di((3-sulfonatocyclopentyl)propyl)phosphino) propane]-palladium(II) acetate,
[1,3-bis(di(8-sulfonatooctyl)phosphino)propane] palladium(II) acetate,
[1,3-bis(di((3-sulfonatocyclohexyl)propyl)phosphino) propane]-palladium(II) acetate,
[1,3-bis(di(carboxyphenyl)phosphino)propane]palladium (II) acetate,
[1,3-bis(di(4-carboxybutyl)phosphino)propane] palladium(II) acetate,
[1,3-bis(di(4-methylol-5-carboxypentyl)phosphino) propane]-palladium(II) acetate,
[1,3-bis(di(5-carboxypentyl)phosphino)propane] palladium(II) acetate,
[1,3-bis(di(6-carboxyhexyl)phosphino)propane] palladium(II) acetate,
[1,3-bis(di((3-carboxycyclopentyl)propyl)phosphino) propane]-palladium(II) acetate,
[1,3-bis(di(8-carboxyoctyl)phosphino)propane]palladium (II) acetate, or
[1,3-bis(di((3-carboxycyclohexyl)propyl)phosphino) propane]-palladium(II) acetate.

The transition metal complexes described are soluble in water to at least some extent. In general, these metal complexes are readily to very readily soluble in water.

Defined metal complexes of the formula (I) can be prepared by the following methods.

In the case of the uncharged chelate complexes (p=0), the preparation is carried out by replacement of weakly coordinating ligands, for example 1,5-cyclooctadiene, benzonitrile or tetramethylethylenediamine, which are bound to the appropriate transition metal compounds, for example transition metal halides, alkyl transition metal halides, diorgano transition metal compounds, by the chelating ligands of the formula (III) as defined above.

The reaction is generally carried out in a polar solvent, for example acetonitrile, acetone, ethanol, diethyl ether, dichloromethane or tetrahydrofuran or mixtures thereof at from −78 to 90° C.

Furthermore, uncharged metal complexes of the formula (I) in which $L^1$ and $L^2$ are carboxylate, e.g. acetate, can be prepared by reacting transition metal salts such as palladium (II) acetate with the chelating ligands (III) described in acetonitrile, acetone, ethanol, diethyl ether, dichloromethane, tetrahydrofuran or water at room temperature. Solvent mixtures can also be used.

A further possible synthetic method is the reaction of the metal complexes of the formula (I) with organometallic compounds of groups IA, IIA, IVA and IIB, for example $C_1$–$C_6$-alkyls of the metals lithium, aluminum, magnesium, tin, zinc, so that formally charged inorganic ligands $L^1$, $L^2$, as defined above, are replaced by formally charged aliphatic, cycloaliphatic or aromatic ligands $L^1$, $L^2$, likewise as defined above. The reaction is generally carried out in a solvent such as diethyl ether or tetrahydrofuran at from −78 to 65° C.

Monocationic complexes of the formula (I) (p=1) can be obtained, for example, by reacting (chelating ligand)metal (acetate)(organo) or (chelating ligand)metal(halo)(organo) complexes with stoichiometric amounts of a metal salt M'X. The reactions are generally carried out in coordinating solvents such as acetonitrile, benzonitrile, tetrahydrofuran or ether at from −78 to 65° C.

It is advantageous for the metal salts M'X to meet the following criteria. The metal M' should preferably form sparingly soluble metal chlorides, for example silver chloride. The salt anion should preferably be a nonnucleophilic anion X, as defined above.

Well-suited salts for the formation of cationic complexes are, for example, silver tetrafluoroborate, silver hexafluorophosphate, silver trifluoromethanesulfonate, silver perchlorate, silver para-toluenesulfonate, silver trifluoroacetate and silver hexafluoroantimonate, sodium tetraphenylborate, sodium tetrakis(pentafluorophenyl) borate, silver trifluoroacetate and sodium tetrakis(3,5-bis (trifluoromethyl)phenyl)borate.

The dicationic complexes (p=2) are prepared in a manner analogous to the monocationic complexes, except that the (chelating ligand)metal(diacetate) or (chelating ligand)metal (dihalo) complexes are used as precursors in place of the (chelating ligand)metal(acetate)(organo) or (chelating ligand)metal(halo)(organo) complexes and two equivalents of the metal salt are used.

A further possible method of preparing the dicationic complexes of the formula (I) is reaction of $[U_4M]X_2$ with the chelating ligands of the formula (III) defined at the outset. Here, U are identical or different, weak ligands such as acetonitrile, benzonitrile or 1,5-cyclooctadiene, and M and X are as defined above.

A preferred method of preparing the metal complexes of the formula (I) is reaction of the dihalo-metal precursor complexes with silver salts having noncoordinating anions.

The copolymers can in principle be obtained by two different methods. In one method of preparation, the above-defined metal complexes a1) are used. These complexes are prepared separately and added as such to the reaction mixture or placed initially in the reaction vessel. In a further method of preparation, the components which form the catalytically active species are added individually to the reaction mixture. In this in-situ generation of the catalyst, the metal M is generally introduced into the reaction vessel in salt form or as a complex salt. In addition, the chelating ligand a1.2) is added. In each of the two methods, an acid a2) and/or a hydroxy compound b) can optionally be added as activator compound. The addition of the activator species can be omitted when the chelating ligand a1.2) contains radicals $R^1$ to $R^4$ which bear at least one free sulfonic or carboxylic acid group.

The use of defined metal complexes a1) frequently gives higher productivities than does the in-situ process.

As olefinically unsaturated compound having from 2 to 20 carbon atoms, it is possible, according to the present invention, to use either pure hydrocarbon compounds or heteroatom-containing α-olefins such as esters or amides of (meth)acrylic acid and also homoallyl or allyl alcohols, ethers or halides. Among the pure hydrocarbons, $C_2$–$C_{20}$-1-alkenes are suitable. Among these, particular mention may be made of low molecular weight olefins such as ethene or α-olefins having from 3 to 8 carbon atoms, e.g. propene, 1-butene, 1-pentene, 1-hexene or 1-octene. It is of course also possible to use cyclic olefins, e.g. cyclopentene, norbornene, aromatic olefin compounds such as styrene or α-methylstyrene or vinyl esters such as vinyl acetate. However, $C_2$–$C_{20}$-1-alkenes are particularly useful. Among these, particular mention may be made of the low molecular weight olefins such as ethene or α-olefins having from 3 to 8 carbon atoms, e.g. propene, 1-butene, 1-pentene, 1-hexene or 1-octene, and also 1-decene, 1-dodecene, 1-tetradecene, 1-hexadecene and 1-octadecene. Of course, it is also possible, according to the present invention, to use mixtures of various olefinically unsaturated compounds of the types mentioned above.

If, in particular, copolymers which are able to form stable aqueous copolymer dispersions are to be obtained, it is advantageous to use the abovementioned olefinically unsaturated compounds having from 2 to 20 carbon atoms in admixture with at least one compound comprising the structural element of the formula (V)

$$—CH=CH—Q—Pol_\pi \qquad (V).$$

Here, Q is a nonpolar organic group selected from the group consisting of linear or branched $C_1$–$C_{20}$-alkyl, often $C_2$–$C_{18}$-alkyl and frequently $C_3$–$C_{14}$-alkyl, for example methyl, ethyl, n- or i-propyl, n-, i- or t-butyl, -pentyl, -hexyl, -heptyl, -octyl, -nonyl, -decyl, -undecyl, -dodecyl, -tridecyl or -tetradecyl, $C_3$–$C_{14}$-cycloalkyl, for example cyclopropyl, cyclobutyl, cyclopentyl or cyclohexyl, $C_6$–$C_{14}$-aryl, for example phenyl, naphthyl or phenanthryl, and alkylaryl having from 1 to 20 carbon atoms in the alkyl part and from 6 to 14 carbon atoms in the aryl part, for example benzyl.

π polar groups Pol are bound to the nonpolar group Q. Here, π is a positive integer. π is preferably 1, 2, 3 or 4. Of course, π can also have a higher numerical value.

Pol is a polar group selected from the group consisting of carboxyl (—$CO_2H$), sulfonyl (—$SO_3H$), sulfate (—$OSO_3H$), phosphonyl (—$PO_3H$), phosphate (—$OP_{O3}H_2$) and alkali metal salts, in particular sodium and potassium salts, alkaline earth metal salts, for example magnesium and calcium salts, and/or ammonium salts thereof.

Pol may likewise be one of the alkanolammonium, pyridinium, imidazolinium, oxazolinium, morpholinium, thiazolinium, quinolinium, isoquinolinium, tropylium, sulfonium, guanidinium and phosphonium compounds obtainable by protonation or alkylation and also, in particular, ammonium compounds of the formula (VI)

$$—N^{\oplus}R^6R^7R^8 \qquad (VI).$$

In this formula, $R^6$, $R^7$ and $R^8$ are each, independently of one another, hydrogen or linear or branched $C_1$–$C_{20}$-alkyl, frequently $C_1$–$C_{10}$-alkyl and often $C_1$–$C_5$-alkyl, with alkyl being, for example, methyl, ethyl, n- or i-propyl, n-, i- or t-butyl, -pentyl, -hexyl, -heptyl, -octyl, -nonyl, -decyl, -undecyl, -dodecyl, -tridecyl or -tetradecyl. The corresponding anions of the abovementioned compounds are nonnucleophilic anions such as perchlorate, sulfate, phosphate, nitrate and carboxylates such as acetate, trifluoroacetate, trichloroacetate, propionate, oxalate, citrate, benzoate, and also conjugate anions of organosulfonic acids, for example methylsulfonate, trifluoromethylsulfonate and para-toluenesulfonate, also tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

However, the polar group Pol can also be a group of the formula (VII), (VIII) or (IX)

$$—(EO)_k—(PO)_l—R^9 \qquad (VII),$$

$$—(PO)_l—(EO)_k—R^9 \qquad (VIII),$$

$$—(EO_k/PO_l)—R^9 \qquad (IX),$$

where

EO is a —$CH_2$—$CH_2$—O— group,

PO is a —$CH_2$—$CH(CH_3)$—O— or a —$CH(CH_3)$—$CH_2$—O— group and k and l are from 0 to 50, frequently from 0 to 30 and often from 0 to 15, but k and l are not simultaneously 0.

The following definitions also apply:

in formula (VII) and (VIII): $(EO)_k$ is a block of k —$CH_2$—$CH_2$—O— groups, and $(PO)_l$ is a block of l —$CH_2$—$CH(CH_3)$—O— or —$CH(CH_3)$—$CH_2$—O— groups, and in formula (IX): ($EO_k/PO_l$) is a random mixture of k —$CH_2$—$CH_2$—O— groups and l —$CH_2$—$CH(CH_3)$—O— or —$CH(CH_3)$—$CH_2$—O— groups.

$R^9$ is hydrogen, linear or branched $C_1$–$C_{20}$-alkyl, often $C_1$–$C_{10}$-alkyl and frequently $C_1$–$C_6$-alkyl, or —$SO_3H$ or an alkali metal salt, alkaline earth metal salt and/or ammonium salt thereof. Alkyl is, for example, methyl, ethyl, n- or i-propyl, n-, i- or t-butyl, -pentyl, -hexyl, -heptyl, -octyl, -nonyl, -decyl, -undecyl, -dodecyl, -tridecyl or -tetradecyl. Alkali metal is, for example, sodium or potassium and alkaline earth metal is, for example, calcium or magnesium.

As a compound comprising the structural element of the formula (V), use is made according to the present invention of, in particular, a-olefins of the formula (X)

$$H_2C=CH—Q—Pol_\pi \qquad (X),$$

where Q, Pol and π are as defined above.

Preferred olefins (X) are 10-undecenoic acid, 3-butenoic acid, 4-pentenoic acid, 5-hexenoic acid and styrene-4-sulfonic acid.

The proportion of the olefinically unsaturated compound(s) containing the structural element of the formula (V) in the monomer mixture to be polymerized, which comprises at least one olefinically unsaturated compound comprising the structural element of the formula (V) and at least one olefinically unsaturated compound having from 2 to 40 carbon atoms, is from 0 to 100% by weight, frequently from 0.5 to 80% by weight and often from 1.0 to 60% by weight or from 2.0 to 40% by weight.

According to the present invention, it is possible for the total amount of the olefinically unsaturated compound(s) to be placed in the polymerization reactor at the beginning. However, it is also possible, if desired, for only part, if any, of the olefinically unsaturated compound(s) to be placed in the polymerization reactor initially and for the remaining amount(s) or the total amount(s) to be added continuously or discontinuously during the polymerization. Of course, it is also possible to add different olefinically unsaturated compounds in a gradient procedure. For the purposes of the present invention, this means that the ratio of the olefinically unsaturated compounds to one another changes during introduction of the olefins.

The process of the present invention can be carried out either batchwise, e.g. in stirring autoclaves, or continuously, e.g. in tube reactors, loop reactors or cascades of stirred vessels.

The dispersants b) used in the process of the present invention can be emulsifiers or protective colloids.

Examples of suitable protective colloids are polyvinyl alcohols, polyalkylene glycols, alkali metal salts of polyacrylic acids and polymethacrylic acids, gelatin derivatives or copolymers comprising acrylic acid, methacrylic acid, maleic anhydride, 2-acrylamido-2-methylpropanesulfonic acid and/or 4-styrenesulfonic acid and alkali metal salts thereof, and also homopolymers and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide and amino-containing acrylates, methacrylates, acrylamides and/or methacrylamides. A comprehensive description of further suitable protectivecolloids may be found in Houben-Weyl, Methoden der organischen Chemie, volume XIV/1, Makromolekulare Stoffe, Georg-Thieme-Verlag, Stuttgart, 1961, pp. 411 to 420.

Of course, it is also possible to use mixtures of protective colloids and/or emulsifiers. The dispersants used are frequently exclusively emulsifiers whose relative molecular weights are, in contrast to the protective colloids, usually less than 1000. They can be either anionic, cationic or nonionic in nature. It is self-evident that when mixtures of surface-active substances are used, the individual components have to be compatible with one another, which can in the case of doubt be checked by means of a few preliminary tests. In general, anionic emulsifiers are compatible with one another and with nonionic emulsifiers. The same applies to cationic emulsifiers, while anionic and cationic emulsifiers are usually not compatible with one another. An overview of suitable emulsifiers may be found in Houben-Weyl, Methoden der organischen Chemie, volume XIV/1, Makromolekulare Stoffe, Georg-Thieme-Verlag, Stuttgart, 1961, pp. 192 to 208.

Useful nonionic emulsifiers are, for example, ethoxylated monoalkylphenols, dialkylphenols and trialkylphenols (EO content: 3–50, alkyl radical: $C_4$–$C_{12}$) and also ethoxylated fatty alcohols (EO content: 3–80; alkyl radical: $C_8$–$C_{36}$). Examples are the Lutensol® A grades ($C_{12}$–$C_{14}$-fatty alcohol ethoxylates, EO content: 3–8), Lutensol® AO grades ($C_{13}$–$C$,5-oxo alcohol ethoxylates, EO content: 3–30), Lutensol® AT grades ($C_{16}$–$C_{18}$-fatty alcohol ethoxylates, EO content: 11–80), Lutensol® ON grades ($C_{10}$-oxo alcohol ethoxylates, EO content: 3–11) and the Lutensol® TO grades ($C_{13}$-oxo alcohol ethoxylates, EO content: 3–20) from BASF AG.

Customary anionic emulsifiers are, for example, alkali metal and ammonium salts of alkyl sulfates (alkyl radical: $C_8$–$C_{12}$), of sulfuric monoesters of ethoxylated alkanols (EO content: 4–30, alkyl radical: $C_{12}$–$C_{18}$) and ethoxylated alkylphenols (EO content: 3–50, alkyl radical: $C_4$–$C_{12}$), of alkylsulfonic acids (alkyl radical: $C_{12}$–$C_{18}$) and of alkylarylsulfonic acids (alkyl radical: $C_9$–$C_{18}$).

Further useful anionic emulsifiers have been found to be compounds of the formula (XI)

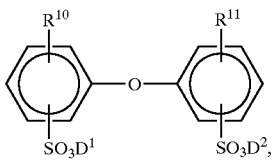

(XI)

where $R^{10}$ and $R^{11}$ are H atoms or $C_4$–$C_{24}$-alkyl groups and are not simultaneously H atoms, and $D^1$ and $D^2$ can be alkali metal ions and/or ammonium ions. In the formula (XI), $R^{11}$ nd $R^{11}$ are preferably linear or branched alkyl radicals having from 6 to 18 carbon atoms, in particular 6, 12 or 16 carbon atoms, or hydrogen, with $R^{10}$ and $R^{11}$ not both being H atoms. $D^1$ and $D^2$ are preferably sodium, potassium or ammonium, with particular preference being given to sodium. Compounds (XI) in which $D^1$ and $D^2$ are sodium, $R^{10}$ is a branched alkyl radical having 12 carbon atoms and $R^{11}$ is an H atom or is as defined for $R^{10}$ are particularly advantageous. Use is frequently made of industrial mixtures which contain from 50 to 90% by weight of the monoalkylated product, for example Dowfax® 2A1 (trademark of the Dow Chemical Company). The compounds (XI) are generally known, e.g. from U.S. Pat. No. 4 269 749, and are commercially available.

Suitable cationic emulsifiers are primary, secondary, tertiary or quaternary ammonium salts, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts which each generally contain a $C_6$–$C_{18}$-alkyl, -alkylaryl or heterocyclic radical. Examples which may be mentioned are dodecylammonium acetate and the corresponding sulfate, the sulfates or acetates of the various 2-(N,N,N-trimethylammonium)ethyl esters of paraffinic acids, N-cetylpyridinium sulfate, N-laurylpyridinium sulfate and N-cetyl-N,N,N-trimethylammonium sulfate, N-dodecyl-N,N,N-trimethylammonium sulfate, N-octyl-N,N,N-trimethlyanrnonium sulfate, N,N-distearyl-N,N-dimethylammonium sulfate and also the gemini surfactant N,N'-(lauryldimethyl)ethylenediamine disulfate, ethoxylated tallow alkyl N-methylammonium sulfate and ethoxylated oleylamine (for example Uniperol® AC from BASF AG, about 12 ethylene oxide units). Numerous further examples may be found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is important that the anionic countergroups have very little nucleophilicity, for example perchlorate, sulfate, phosphate, nitrate and carboxylates such as acetate, trifluoroacetate, trichloroacetate, propionate, oxalate, citrate, benzoate, and conjugate anions of organosulfonic acids, for example methylsulfonate, trifluoromethylsulfonate and para-toluenesulfonate, also tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

Suitable organic hydroxy compounds c) include all low molecular weight organic substances ($M_w$<500) which have one or more hydroxyl groups. Preference is given to lower alcohols having from 1 to 6 carbon atoms, e.g. methanol, ethanol, n- or i-propanol, n-butanol, s-butanol or t-butanol. It is also possible to use aromatic hydroxy compounds such as phenol. Sugars such as fructose, glucose and lactose are likewise suitable. Further suitable hydroxy compounds include polyalcohols such as ethylene glycol, glycerol and polyvinyl alcohol. Of course, it is also possible to use mixtures of a plurality of hydroxy compounds.

An important aspect is that stable aqueous dispersions of copolymers can be obtained in the presence or absence of water-soluble macromolecular host compounds even when the copolymerization is carried out in the absence of compounds comprising the structural element of the formula (V)

$$—CH=CH—Q—Pol_\pi \qquad (V).$$

This is, in particular, the case when the copolymerization is carried out in the presence of emulsifiers containing ethoxy groups, for example ethoxylated monoalkylphenols, dialkylphenols and trialkylphenols (EO content: 3–50, alkyl radical: $C_4$–$C_{12}$) and ethoxylated fatty alcohols (EO content: 3–80; alkyl radical: $C_8$–$C_{36}$) or sulfuric monoesters of ethoxylated alkanols (EO content: 4–30, alkyl radical: $C_{12}$–$C_{18}$) and ethoxylated alkylphenols (EO content: 3–50, alkyl radical: $C_4$–$C_{12}$). The total amount of at least one of the abovementioned emulsifiers necessary to achieve this effect is generally from 0.1 to 10 parts by weight, frequently from 0.5 to 7 parts by weight or from 1 to 5 parts by weight and often from 1 to 3 parts by weight, in each case based on 100 parts by weight of the olefinically unsaturated compounds to be polymerized.

It is an essential aspect of the present invention that at least one water-soluble macromolecular host compound having a hydrophobic cavity and a hydrophilic shell is present during the polymerization in an aqueous medium. For the purposes of the present invention, water-soluble macromolecular host compounds are host compounds which have a solubility of $\geq 10$ g per liter of water at 25° C. and 1 bar (absolute). It is useful for the solubility of the macromolecular host compounds under the abovementioned conditions to be $\geq 25$ g/l, $\geq 50$ g/l, $\geq 100$ g/l, $\geq 200$ g/l or $\geq 300$ g/l.

Water-soluble macromolecular host compounds which can advantageously be used are, for example, calixarenes, cyclic oligosaccharides, acyclic oligosaccharides and/or derivatives thereof.

Calixarenes which can be used according to the present invention are described in U.S. Pat. No. 4,699,966, the international patent application WO 89/08092 and the Japanese patents 1988/197544 and 1989/007837.

Cyclic oligosaccharides which can be used are, for example, the cycloinulohexose and cycloinuloheptose described by Takai et al. in Journal of Organic Chemistry, 1994, 59(11), pp. 2967 to 2975, and also cyclodextrins and/or derivatives thereof.

Particularly useful cyclodextrins are α-cyclodextrin, β-cyclodextrin and γ-cyclodextrin and also their methyl, triacetyl, hydroxypropyl and hydroxyethyl derivatives. Particular preference is given to the commercially available, unmodified compounds Cavamax®W6, Cavamax®W7 or Cavamax®W8, the partially methylated compounds Cavasol®W6M, Cavasol®W7M or Cavasol®W8M and also the partially hydroxypropylated compounds Cavasol®W6HP, Cavasol®W7HP or Cavasol®W8HP (tradenames of Wacker-Chemie GmbH).

Noncyclic oligosaccharides used are, for example, starches and/or their degradation products.

The water-soluble starches or starch degradation products are frequently native starches which have been made water-soluble by boiling with water, or starch degradation products which are obtained from native starches by, in particular, acid-catalyzed hydrolysis, enzymatically catalyzed hydrolysis or oxidation. Such degradation products are also referred to as dextrins, roaster dextrins or saccharified starches. Their preparation from native starches is known to those skilled in the art and is described, for example, in G. Tegge, Starke und Starkederivate, EAS Verlag, Hamburg 1984, p. 173 ff. and p. 220 ff., and in EP-A 0441 197. As native starches, it is possible to use virtually all starches of vegetable origin, for example starches from maize, wheat, potatoes, tapioca, rice, sago and sorghum.

According to the present invention, it is also possible to use chemically modified starches or starch degradation products. For the purposes of the present invention, chemically modified starches or starch degradation products are starches or starch degradation products in which at least some of the OH groups have been converted into derivatives, e.g. have been etherified or esterified. Chemical modification can be carried out either on the native starches or on the degradation products. It is likewise possible to convert the chemically modified starches subsequently into their chemically modified degradation products.

The esterification of starch or starch degradation products can be carried out using either inorganic or organic acids, their anhydrides or their chlorides. Customary esterified starches are phosphated and/or acetylated starches or starch degradation products. Etherification of the OH groups can be carried out, for example, by means of organic halogen compounds, epoxides or sulfates in aqueous alkaline solution. Examples of suitable ethers are alkyl ethers, hydroxyalkyl ethers, carboxyalkyl ethers, allyl ethers and cationically modified ethers, e.g. (trisalkylammonium)alkyl ethers and (trisalkylammonium)-hydroxyalkyl ethers. Depending on the type of chemical modification, the starches or the starch degradation products can be uncharged, cationic, anionic or amphiphilic. The preparation of modified starches and starch degradation products is known to those skilled in the art (cf. Ullmann's Encyclopedia of Industrial Chemistry, $5^{th}$ ed., vol. 25, pp. 12 to 21, and references cited therein).

In a particularly preferred embodiment of the present invention, water-soluble starch degradation products and their chemically modified derivatives which are obtainable by hydrolysis, oxidation or enzymatic degradation of native starches or chemically modified starch derivatives are used. Such starch degradation products are also referred to as saccharified starches (cf. G. Tegge, pages 220 ff.). Saccharified starches and their derivatives are commercially available (e.g. C*Pur® products 01906, 01908, 01910, 01912, 01915, 01921, 01924, 01932 or 01934 from Cerestar Deutschland GmbH, Krefeld) or can be prepared by degradation of commercial starches using known methods, for example by oxidative hydrolysis with peroxides or enzymatic hydrolysis of the starches or chemically modified starches. Particular preference is given to starch degradation products which are obtainable by hydrolytic means and have not been further modified chemically.

In a particularly preferred embodiment of the present invention, starch degradation products or chemically modified starch degradation products having a weight average molecular weight $M_w$ in the range from 1 000 to 30 000 dalton, particularly preferably from 3 000 to 10 000 dalton, are used. Such starches are completely soluble in water at 25° C. and 1 bar, with the solubility limit generally being above 50% by weight, which is particularly advantageous for the preparation of the copolymers of the present invention in an aqueous medium. According to the present invention, particular preference is given to using C*Pur® 01906 ($M_w$=about 20 000) and C*Pur® 01934 ($M_w$=about 3 000).

Figures quoted for the molecular weight of the saccharified starches to be used according to the present invention are based on determinations by means of gel permeation chromatography under the following conditions:
Columns: 3 steel columns, 7.5×600 mm, filled with TSK gel G 2000 PW and G 4000 PW. Pore size: 5 μm.
Eluant: deionized water
Temperature: 20–25° C. (room temperature)
Detection: differential refractometer (e.g. ERC 7511)
Flow: 0.8 ml/min. Pump: (e.g. ERC 64.00)
Injection valve: 20 μl valve: (e.g. VICI 6-way valve)
Evaluation: Bruker Chromstar GPC software
Calibration: Calibration was carried out in the low molecular weight range using glucose, raffinose, maltose and maltopentose. For the relatively high molecular weight range, Pullulan standards having a polydispersity of <1.2 were used.

The amount of water-soluble macromolecular host compound used in the process of the present invention is from 0.1 to 50 parts by weight, preferably from 0.2 to 20 parts by weight and particularly preferably from 0.5 to 10 parts by weight, in each case based on 100 parts by weight of the olefinically unsaturated compounds used.

The molar ratio of carbon monoxide to the olefinically unsaturated compound or compounds having from 2 to 20 carbon atoms is generally in the range from 10:1 to 1:10, usually in the range from 5:1 to 1:5 or from 2:1 to 1:2.

The copolymerization temperature is generally in the range from 0 to 200° C., preferably from 20 to 130° C. and in particular from 40 to 100° C. The partial pressure of carbon monoxide is generally in the range from 1 to 300 bar, in particular from 10 to 220 bar. It is advantageous for the total partial pressure of the olefinically unsaturated compounds under the reaction conditions to be less than the partial pressure of carbon monoxide. In particular, the total partial pressure of the olefinically unsaturated compounds under the reaction conditions is ≦50%, ≦40%, ≦30% or even ≦20%, in each case based on the total pressure. The polymerization reactor is usually made inert by flushing with carbon monoxide or inert gas, for example nitrogen or argon, before being pressurized with carbon monoxide. However, it is frequently possible to carry out the polymerization without the reactor being made inert beforehand.

To activate the catalyst, suitable acids a2) can be used as activator compounds. Both mineral protic acids and Lewis acids are possible as activator compounds. Suitable protic acids are, for example, sulfuric acid, nitric acid, boric acid, tetrafluoroboric acid, perchloric acid, p-toluenesulfonic acid, trifluoroacetic acid, trifluoromethanesulfonic acid or methanesulfonic acid. Preference is given to using p-toluenesulfonic acid and tetrafluoroboric acid.

Suitable Lewis acids a2) are, for example, boron compounds such as triphenylborane, tris(pentafluorophenyl) borane, tris(p-chlorophenyl)borane and tris(3,5-bis (trifluoromethyl)-phenyl)borane or aluminum, zinc, antimony or titanium compounds having Lewis acid character. It is also possible to use mixtures of protic acids, mixtures of Lewis acids or mixtures of protic and Lewis acids.

The molar ratio of activator to metal complex a1), based on the amount of metal M, is generally in the range from 60:1 to 1:1, preferably from 25:1 to 2:1 and particularly preferably from 12:1 to 3:1, for those cases in which the functional groups of the radicals $R^1$ to $R^4$ do not include sulfonic acid or carboxylic acid functions. Of course, activator compound a2) can be added to the polymerization mixture even in the case of metal complexes with chelating ligands which bear the abovementioned functional acid groups.

The emulsifiers which are preferably used as dispersant b) are advantageously used in a total amount of from 0.005 to 10% by weight, preferably from 0.01 to 7% by weight, in particular from 0.1 to 5% by weight, in each case based on the total amount of the olefinically unsaturated compounds.

The total amount of the protective colloids used as dispersant b) in addition to or instead of the emulsifiers is often from 0.1 to 10% by weight and frequently from 0.2 to 7% by weight, in each case based on the total amount of olefinically unsaturated compounds.

The ratio of equivalents of the optionally used hydroxy compound c) to the metal complex a1), based on the amount of metal M, is generally in the range from 0 to 100 000, often from 500 to 50 000 and frequently from 1 000 to 10 000. For the purposes of the present invention, an equivalent of the hydroxy compound c) is the number of moles of the hydroxy compound c) multiplied by the number of hydroxy groups present per molecule.

In the polymerization process of the present invention, the mean catalyst activity obtained is generally ≧0.17 kg, frequently ≧0.25 kg and often ≧0.5 kg, of copolymer per gram of complexed metal and hour.

The polymerization process of the present invention gives copolymers whose number average particle diameter determined by pseudoelastic light scattering (ISO standard 13321) is in the range from 1 to 2 000, preferably for 10 to 1 500 nm and often from 15 to 1 000 nm.

The weight average molecular weights of the copolymers obtainable according to the present invention as determined by means of gel permeation chromatography using polymethyl methacrylate as standard are generally in the range from 1 000 to 1 000 000, frequently in the range from 1 500 to 800 000 and often in the range from 2 000 to 600 000.

The copolymers obtainable by the process of the present invention are, as $^{13}$C- and $^1$H-NMR spectroscopic studies demonstrate, generally linear, alternating carbon monoxide copolymer compounds, namely copolymer compounds in which one —$CH_2$—$CH_2$—, -$CH_2$—CH— or —CH—CH— unit derived from the olefinically unsaturated compound or compounds is present in the polymer chain for each carbon monoxide unit and each —$CH_2$—$CH_2$—, —$CH_2$—CH— or —CH—CH— unit is followed by a carbon monoxide unit. In particular, the ratio of carbon monoxide units to —$CH_2$—$CH_2$—, —$CH_2$—CH— or —CH—CH— units is generally from 0.9:1 to 1:0.9, frequently from 0.95:1 to 1:0.95 and often from 0.98:1 to 1:0.98.

Targeted variation of the olefinically unsaturated compounds makes it possible according to the present invention to prepare copolymers whose glass transition temperature or melting point is in the range from –60 to 270° C.

For the purposes of the present invention, the glass transition temperature $T_g$ is the limiting value to which the glass transition temperature tends with increasing molecular weight, as described by G. Kanig (Kolloid-Zeitschrift & Zeitschrift fur Polymere, vol. 190, p. 1, equation 1). The glass transition temperature is determined by DSC (differential scanning calorimetry, 20 K/min, midpoint measurement, DIN 53765).

According to Fox (T. G. Fox, Bull. Am. Phys. Soc. 1956 [Ser. II] 1, p. 123), and according to Ullmann's Encyclopadie der technischen Chemie, vol. 19, p. 18, 4th edition, Verlag Chemie, Weinheim, 1980, the glass transition temperature of at most only slightly crosslinked copolymers is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees Kelvin of the polymers composed in each case of only one of the monomers 1, 2, . . . n. The $T_g$ values for the homopolymers of most monomers are known and are given in, for example, Ullmann's Encyclopedia of Industrial Chemistry, vol. 5, A21, p. 169, VCH Weinheim, 1992; further sources of glass transition temperatures of homopolymers are, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989).

The copolymer dispersions of the present invention generally have minimum film formation temperatures MFT of <80° C., preferably ≦50° C. and particularly preferably ≦30° C. Since the MFT below 0° C. is no longer measurable, the lower limit of the MFT can only be indicated by the $T_g$ values. The determination of the MFT is carried out in accordance with DIN 53787.

The process of the present invention makes it possible to obtain aqueous copolymer systems whose solids content is from 0.1 to 70% by weight, frequently from 1 to 65% by weight and often from 5 to 60% by weight and all values in between.

It is of course possible for the residual monomers remaining in the aqueous copolymer system after conclusion of the main polymerization reaction to be removed by steam stripping and/or inert gas stripping without the polymer properties of the copolymers present in the aqueous medium being adversely affected.

The catalytic metal complex still present in the aqueous medium can frequently, if required, be removed from the aqueous copolymer system which can be obtained according to the present invention. For this purpose, the disperse copolymer can, for example, be separated from the aqueous serum by centrifugation, redispersed by addition of neutral, acidic and/or basic water, centrifuged again, etc., with the water-soluble metal complex accumulating in the serum. Furthermore, it is often also possible to remove the metal complex by dialysis methods. The copolymer frequently precipitates during the polymerization reaction in the aqueous medium. In this case, the aqueous serum can be separated from the copolymer by simple filtration.

If aqueous copolymer dispersions are obtained according to the present invention, they are frequently stable for a number of weeks or months and display virtually no phase separation, precipitation or coagulum formation during this time. They are very useful as, in particular, binders in the production of adhesives, for example contact adhesives, building adhesives or industrial adhesives, sealing compositions, polymer-based plasters, renders and coatings, for example for paper coating, emulsion paints or for printing inks for printing polymer films and for producing nonwovens or for producing protective layers and water vapor barriers, for example in priming. These aqueous copolymer dispersions can likewise be used for modifying mineral binders or other synthetic polymers.

Mention may also be made of the fact that the aqueous copolymer dispersions obtainable according to the present invention can be dried in a simple manner to produce redispersible copolymer powders (e.g. freeze drying or spray drying). This applies particularly when the glass transition temperature of the copolymers is ≧50° C., preferably ≧60° C., particularly preferably ≧70° C., very particularly preferably ≧80° C. and most preferably ≧90° C. or ≧100° C. The copolymer powders are likewise suitable as binders in adhesives, sealing compositions, polymer-based plasters, renders and coatings, and also for producing nonwovens or for modifying mineral binders, for example mortar or cement, or as modifying additives in other synthetic polymers.

On the other hand, if the copolymer precipitates during the polymerization, it can be separated from the aqueous medium by simple filtration. Subsequent drying gives a copolymer which is particularly useful for modifying other synthetic polymers and for producing moldings, in particular by injection molding or extrusion, and for the coating of surfaces.

The process of the present invention provides an economical, environmentally friendly, technically simple and essentially safe route to linear, alternating carbon monoxide copolymers. The process of the present invention makes it possible, by use of water-soluble macromolecular host compounds, to increase, in particular, the polymerization rate and the yields of copolymers.

The present invention is illustrated by the following examples.

EXAMPLES

1. Preparation of the Metal Complex 1.1 Preparation of 1,3-bis(Diethyl Phosphonite)propane 674 g of triethyl phosphite (98% by weight; Aldrich) were added at 20–25°C. (room temperature) to 204 g of 1,3-dibromopropane (99% by weight; Aldrich) and the mixture was slowly heated while stirring to 140° C. The bromoethane formed was removed by distillation. After the liberation of bromoethane had largely abated, the reaction temperature was increased to 155° C. and the reaction mixture was stirred at this temperature for 24 hours. A further 674 g of triethyl phosphite were subsequently added dropwise and the reaction was stopped after a further 24 hours by removal of excess triethyl phosphite by distillation. Monosubstituted product was removed by distillation at 150° C. in a high vacuum [0.1 mbar (absolute)]. The distillation residue which remained was 1,3-bis(diethyl phosphonite)propane. The yield was 271 g, corresponding to 86% by weight based on 1,3-dibromoethane.

1.2 Preparation of 1,3-diphosphinopropane

A solution consisting of 103.3 g of 1,3-bis(diethyl phosphonite)propane in 100 ml of anhydrous, argon-saturated diethyl ether was added while stirring at 0° C. to a suspension of 25 g of $LiAlH_4$ (95% by weight, Aldrich) in 200 ml of anhydrous diethyl ether over a period of 180 minutes. The reaction temperature was subsequently increased to room temperature and the reaction mixture was stirred at this temperature for 16 hours. 200 ml of degassed and argon-saturated 6 molar aqueous hydrochloric acid were then added slowly to hydrolyze excess $LiAlH_4$. The organic phase was then separated off and dried over sodium sulfate for 24 hours. The aqueous phase was mixed with 200 ml of diethyl ether and the diethyl ether phase was separated off and likewise dried over sodium sulfate for 24 hours. The two diethyl ether phases were subsequently combined. After removal of the diethyl ether by distillation at 60° C./1 bar (absolute), 1,3-diphosphinopropane distilled over at 140° C./1 bar (absolute).

The yield was 20 g, corresponding to 61% by weight based on 1,3-bis(diethyl phosphonite)propane.

1.3 Preparation of 1,3-bis(di-5-hydroxypentylphosphino) Propane 1.08 g of 1,3-diphosphinopropane and 4.47 g of 5-pentene-1-ol (whose preparation was carried out by a method analogous to that described in Organikum, 18th edition, Deutscher Verlag der Wissenschaften, 1990, by alkylation of diethyl malonate with allyl bromide [p. 518], via saponification to the dicarboxylic acid [p. 415], decarboxylation to the 4-pentenoic acid [p. 416] and subsequent reduction with $LiAlH_4$ [p. 492]) which had been multiply degassed and saturated with argon were mixed at room temperature and, in a fused silica Schlenk tube, irradiated with the UV light from a high-pressure Hg lamp (200 W) for 24 hours. Excess 5-pentene-1-ol was subsequently distilled off at 60° C./20 mbar (absolute) on a rotary evaporator. This left as residue 4.34 g, corresponding to 96% by weight, based on 1,3-diphosphinopropane, of 1,3-bis(di-5-hydroxypentylphosphino)propane.

1.4 Preparation of [1,3-bis(di-5-hydroxypentylphosphino)-propane]palladium(II) Acetate 0.9 g of 1,3-bis(di-5-hydroxypentylphosphino)propane was dissolved in 10 ml of multiply degassed and argon-saturated tetrahydrofuran (99.9% by weight; Merck) and slowly added dropwise to a solution of 0.44 g of palladium (II) acetate in 15 ml of degassed, argon-saturated tetrahydrofuran. To complete the reaction, the mixture was stirred at room temperature for another 20 minutes. The solvent was removed at 60° C./0.1 mbar (absolute) and the defined palladium complex was isolated as a brownish yellow, highly viscous oil. 1.30 g of palladium complex, corresponding to 98% by weight based on palladium(II) acetate, were obtained.

2. Polymerization Examples

Example 1

10 mg of [1,3-bis(di-5-hydroxypentylphosphino)propane]-palladium(II) acetate were dissolved in 75 ml of deionized and degassed water at room temperature under nitrogen in a 250 ml single-neck flask provided with a nitrogen cock, and acidified with 26 mg of 50% strength by weight aqueous tetrafluoroboric acid (from Merck). 30 g of 1-hexene (97% by weight; Aldrich), 1.0 g of Cavamax®W7 (β-cyclodextrin) and 1.0 g of Texapon®NSO (sodium salt of the sulfuric monoester of n-dodecanol ethoxylate, mean number of ethylene oxide units: 25; tradename of Henkel, Germany) were added to this solution under a nitrogen atmosphere and the mixture was completely emulsified by means of a magnetic stirrer (500 revolutions per minute, 10 minutes). The emulsion was transferred to a 300 ml steel autoclave fitted with a bar stirrer and the air was displaced by flushing a number of times with carbon monoxide. The autoclave was pressurized with carbon monoxide to 60 bar at room temperature and the reaction mixture was then heated while stirring (500 revolutions per minute) to 60° C. and stirred at this temperature for 10 hours. The reaction mixture was subsequently cooled to room temperature and the autoclave was depressurized to 1 bar (absolute). Unreacted alkene was separated from the aqueous copolymer dispersion in a separating funnel, leaving about 100 g of the dispersion. The coagulum content of the aqueous polymer dispersion was <0.1% by weight. The solids content was determined as 23% by weight, corresponding to a mean catalyst activity of 1 330 gram of copolymer per gram of palladium and hour. The number average particle diameter was 100 nm. In addition, the glass transition temperature was determined as –35° C. The aqueous copolymer dispersion obtained was stable and displayed no phase separation, precipitation or coagulum formation over a period of 10 weeks.

The coagulum content was determined in general by filtering the aqueous copolymer dispersion obtained through a 45 μm filter cloth. The filter cloth was subsequently rinsed with 50 ml of deionized water and dried to constant weight at 100° C./1 bar (absolute). The coagulum content was determined from the weight difference between the filter cloth prior to filtration and the filter cloth after filtration and drying.

The solids content was determined in general by drying about 1 g of the aqueous copolymer system in an open aluminum crucible having an internal diameter of about 3 cm to constant weight at 100° C. and 10 mbar in a drying oven. To determine the solids content, two separate measurements were carried out in each case and the corresponding mean was calculated.

The number average particle diameter of the copolymer particles was determined in general on a 0.005–0.01 percent strength by weight aqueous dispersion by dynamic light scattering at 23° C. using an Autosizer IIC from Malvern Instruments, UK. The value reported is the mean diameter of the cumulative distribution (cumulant z-average) of the measured autocorrelation function (ISO standard 13321).

The determination of the glass transition temperature or the melting point were carried out in general in accordance with DIN 53765 by means of a DSC820 instrument, series TA8000 from Mettler-Toledo.

1st Comparative Example

The preparation of the comparative example was carried out using a method analogous to that of example 1, except that no Cavamax®W7 was added. After phase separation, about 100 g of aqueous copolymer dispersion having a solids content of 9% by weight were obtained. The coagulum content of the aqueous copolymer dispersion was about 0.1% by weight and the number average particle diameter was determined as 80 nm. In addition, a glass transition temperature of –35° C. was determined.

Example 2

The procedure for example 2 was analogous to that of example 1, except that 1.0 g of 10-undecenoic acid (98% by weight; Aldrich) was used in place of 30 g of 1-hexene and the autoclave was pressurized with 30 bar of carbon monoxide and 30 bar of ethene instead of with 60 bar of carbon monoxide.

After degassing, the aqueous copolymer dispersion obtained had a solids content of 12% by weight, corresponding to a mean catalyst activity of 500 g of copolymer per gram of palladium and hour. The coagulum content was determined as <0.1% by weight and the number average particle diameter was determined as 500 nm. The copolymer formed had a melting point of 210° C. In addition, the aqueous copolymer dispersion obtained was stable and displayed no phase separation, precipitation or coagulum formation over a period of 10 weeks.

2nd Comparative Example

The preparation of the 2nd comparative example was carried out by a method analogous to that of example 2, except that no Cavamax®W7 was added. After degassing, an aqueous copolymer dispersion having a solids content of 8% by weight was obtained. The coagulum content of the aqueous copolymer dispersion was about 0.1% by weight and the number average particle diameter was determined as 450 nm.

Example 3

15 mg of [1,3-bis(di-5-hydroxypentylphosphino)propane]-palladium(II) acetate were dissolved in 75 ml of deionized and degassed water at room temperature under nitrogen in a 250 ml single-neck flask provided with a nitrogen cock, and acidified with 31 mg of 50% strength by weight aqueous tetrafluoroboric acid. 30 g of 1-butene, 3.0 g of Cavasol®W7M (partially methylated cyclodextrin) and 1.0 g of Texapon®NSO were added to this solution under a nitrogen atmosphere and the mixture was completely emulsified by means of a magnetic stirrer (500 revolutions per minute, 10 minutes). The emulsion was transferred to a 300 ml steel autoclave fitted with a bar stirrer and the air was displaced by flushing a number of times with carbon monoxide. The autoclave was pressurized with carbon monoxide to 60 bar at room temperature and the reaction mixture was then heated while stirring (500 revolutions per minute) to 60° C. and stirred at this temperature for 10 hours. The reaction mixture was subsequently cooled to room temperature and the autoclave was depressurized to 1 bar (absolute). About 100 g of aqueous copolymer dispersion having a solids content of 20% by weight were obtained, corresponding to a mean catalyst activity of 1 150 gram of copolymer per gram of palladium and hour. The coagulum content of the aqueous polymer dispersion was <0.1% by weight. The number average particle diameter was 120 nm. In addition, the glass transition temperature was determined as −17° C. The aqueous copolymer dispersion obtained was stable and displayed no phase separation, precipitation or coagulum formation over a period of 10 weeks.

Example 4

15 mg of [1,3-bis(di-5-hydroxypentylphosphino)propane]-palladium(II) acetate were dissolved in 75 ml of deionized and degassed water at room temperature under nitrogen in a 250 ml single-neck flask provided with a nitrogen cock, and acidified with 31 mg of 50% strength by weight aqueous tetrafluoroboric acid. 30 g of 1-decene (94% by weight; Aldrich), 1.0 g of C*Pur®01906 (saccharified starch) and 1.0 g of Texapon®NSO were added to this solution under a nitrogen atmosphere and the mixture was completely emulsified by means of a magnetic stirrer (500 revolutions per minute, 10 minutes). The emulsion was transferred to a 300 ml steel autoclave fitted with a bar stirrer and the air was displaced by flushing a number of times with carbon monoxide. The autoclave was pressurized with carbon monoxide to 60 bar at room temperature and the reaction mixture was then heated while stirring (500 revolutions per minute) to 60° C. and stirred at this temperature for 10 hours. The reaction mixture was subsequently cooled to room temperature and the autoclave was depressurized to 1 bar (absolute). About 95 g of aqueous copolymer dispersion having a solids content of 15% by weight were obtained. The coagulum content of the aqueous polymer dispersion was <0.1% by weight. The number average particle diameter was 110 nm. In addition, the glass transition temperature was determined as −55° C. and the weight average molecular weight was determined as 15 000 g/mol. The aqueous copolymer dispersion obtained was stable and displayed no phase separation, precipitation or coagulum formation over a period of 10 weeks.

Example 5

15 mg of [1,3-bis(di-5-hydroxypentylphosphino)propane]-palladium(II) acetate were dissolved in 75 ml of deionized and degassed water at room temperature under nitrogen in a 250 ml single-neck flask provided with a nitrogen cock, and acidified with 31 mg of 50% strength by weight aqueous tetrafluoroboric acid. 30 g of 1-octadecene, 0.5 g of Cavasol®W7M and 1.0 g of Texapon®NSO were added to this solution under a nitrogen atmosphere and the mixture was completely emulsified by means of a magnetic stirrer (500 revolutions per minute, 10 minutes). The emulsion was transferred to a 300 ml steel autoclave fitted with a bar stirrer and the air was displaced by flushing a number of times with carbon monoxide. The autoclave was pressurized with carbon monoxide to 60 bar at room temperature and the reaction mixture was then heated while stirring (500 revolutions per minute) to 60° C. and stirred at this temperature for 10 hours. The reaction mixture was subsequently cooled to room temperature and the autoclave was depressurized to 1 bar (absolute). About 95 g of aqueous copolymer dispersion having a solids content of 14% by weight were obtained. The coagulum content of the aqueous polymer dispersion was <0.1% by weight. The number average particle diameter was 80 nm. In addition, the melting point was determined as 40° C. and the weight average molecular weight was determined as 11 000. The aqueous copolymer dispersion obtained was stable and displayed no phase separation, precipitation or coagulum formation over a period of 10 weeks.

We claim:

1. A process for preparing copolymers of carbon monoxide and an olefinically unsaturated compound having from 2 to 20 carbon atoms in an aqueous medium, comprising copolymerizing carbon monoxide and an olefinically unsaturated compound in an aqueous medium in the presence of a1) metal complexes of the formula (I)

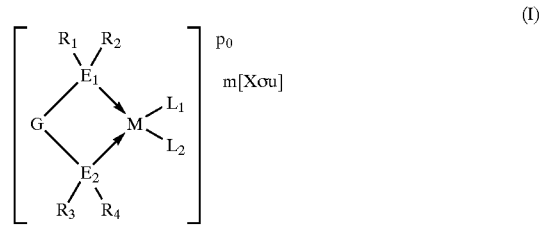

where the substituents and indices have the following meanings:

G is a 5-, 6- or 7-membered carbocyclic ring system without heteroatoms or containing one or more heteroatoms, $-(CR^b_2)_r-$, $-(CR^b_2)_s-Si(R^a)_2-(CR^b_2)_t-$, $-A-O-B-$ or $-A-Z(R^5)-B-$, where $R^5$ is hydrogen, $C_1-C_{20}$-alkyl, $C_3-C_{14}$-cycloakyl, $C_6-C_{14}$-aryl or alkylaryl having from 1 to 20 carbon atoms in the alkyl part and from 6 to 14 carbon atoms in the aryl part, each of which may be unsubstituted or substituted by functional groups containing atoms of groups IVA, VA, VIA or VIIA of the Periodic Table of the Elements, or is $-N(R^b)_2$, $-Si(R^c)_3$ or a radical of the formula (II)

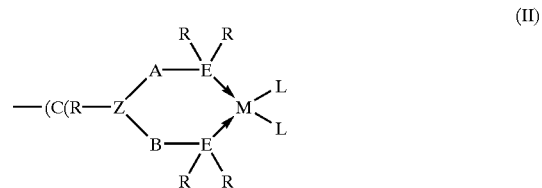

where q is an integer from 0 to 20 and the further substituents in formula (II) are as defined in formula (I), A,B are each $-(CR^b_2)_r-$, $-(CR^b_2)_s-Si(R^a)_2-(CR^b_2)_t-$, $-N(R^b)-$, an r'-, s- or t-atomic constituent of a ring system or together with Z form an (r'+1)—, (s+1)— or (t+1)-atomic constituent of a heterocycle, $R^a$ are each, independently of one another, linear or branched $C_1$–$C_{20}$-alkyl, $C_3$–$C_{14}$-cycloalkyl, $C_6$–$C_{14}$-aryl or alkylaryl having from 1 to 20 carbon atoms in the alkyl part and from 6 to 14 carbon atoms in the aryl part, where the specified radicals may also be substituted, $R^b$ is as defined for $R^a$, or hydrogen or —Si$(R^c)_3$, $R^c$ are each, independently of one another, linear or branched $C_1$–$C_{20}$-alkyl, $C_3$–$C_{14}$-cycloalkyl, $C_6$–$C_{14}$-aryl or alkylaryl having from 1 to 20 carbon atoms in the alkyl part and from 6 to 14 carbon atoms in the aryl part, where the specified radicals may also be substituted, r is 1,2,3 or 4 and r' is 1 or 2, s, t are each 0, 1 or 2, where 1 £s+t £3, Z is a nonmetallic element of group VA of tie Periodic Table of the Elements, M is a mental selected from the group consisting of groups VIIIB, IB and IIB of the Periodic Table of the Elements, $E^1$, $E^2$ are each a nonetalc element from the group consisting of group VA of the Periodic Table of the Elements, $R^1$ to $R^4$ are each, independently of one another, linear or branched $C_{2-20}$-alkyl, $C_3$–$C_{14}$-cycloalkyl, $C_6$–$C_4$-aryl or alkylaryl having from 1 to 20 carbon atoms in the alkyl part and from 6 to 14 carbon atoms in the aryl part, where at least one of the radicals $R^1$ to $R^4$ bears at least one hydroxy, amino or acid group or contains an ionic functional group, $L^1$, $L^2$ are formally charged or uncharged ligands, X are formally monovalent or polyvalent anions, p is 0, 1, 2, 3 or 4, m, n are each 0, 1, 2, 3 or 4, where p=m×n, b) a dispersant and c) optionally an organic hydroxy compound, wherein the copolymerization is carried out in the presence of a water-soluble macromolecular host compound which has a hydrophobic cavity and a hydrophilic shell.

2. A process as claimed in claim 1, wherein the copolyrnerization is carried out in the presence of a1) metal complexes of the formula (I) and a2) an acid.

3. A process for preparing copolymers of carbon monoxide and an olefinically unsaturated compound having from 2 to 20 carbon atoms in an aqueous medium, comprising copolymerizing carbon monoxide and an olefinically unsaturated compound in an aqueous medium in the presence of a1.1) a metal M selected from the group consisting of groups VIIIB, IB or IIB of the Periodic Table of the Elements, which is present in salt form or as a complex salt, a1.2) a chelating ligand of the formula (III)

$(R^1)(R^2)E^1$—G—$E^2(R^3)(R^4)$    (III), where the substituents and indices have the following meanings;

G is a 5-, 6- or 7-membered carbocyclic ring system without heteroatoms or containing one or more heteroatoms, —$(CR^b{}_2)_r$—, —$(CR^b{}_2)_s$—Si$(R^a)_2$—$(CR^b{}_2)_t$—, —A—O—B— or —A—Z$(R^5)$—B—, where $R^5$ is hydrogen, $C_{1-20}$-alkyl, $C_3$–$C_4$-cycloalkyl, $C_6$–$C_{14}$-aryl or alkylaryl having Noun 1 to 20 carbon atoms in the alkyl part and from 6 to 14 carbon atoms in the aryl part, each of which may be unsubstituted or substituted by functional groups containing atoms of groups IVA, VA, VIA or VIIA of the Periodic Table of the Elements, or is —N$(R^b)_2$, —Si$(R^c)_3$ or a radical of the formula (IV)

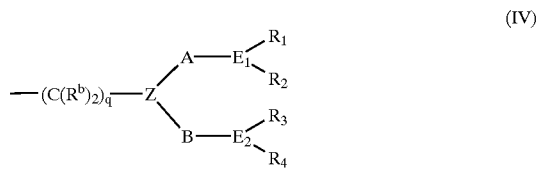

(IV)

where q is an integer from 0 to 20 and the further substituents in formula (IV) are as defined for formula (II), A,B are each —$(CR^b{}_2)_r$—, —$(CR^b{}_2)_s$—Si$(R^a)_2$—$(CR^b{}_2)_t$—, —N$(R^b)$—, an r'-, s- or t-atomic constituent of a ring system or together with Z form an (r'+1)-, (s+1)- or (t+1)-atomic constituent of a heterocycle, $R^a$ are each, independently of one another, linear or branched $C_1$–$C_{20}$-alkyl, $C_3$–$C_{14}$-cycloalkyl, $C_6$–$C_{14}$-aryl or alkylryl having from 1 to 20 carbon atoms in the alkyl part and from 6 to 14 carbon atoms in the aryl part where the specified radicals may also be substituted, $R^b$ is as defined for $R^a$, or hydrogen or —Si$(R^c)_3$, $R^c$ are each, independently of one another, linear or branched $C_1$–$C_{20}$-alkyl, $C_3$–$C_{14}$-cycloalkyl, $C_6$–$C_{14}$-aryl or alkylaryl having from 1 to 20 carbon atoms in the alkyl part and from 6 to 14 carbon atoms in the aryl part, where the specified radicals may also be substituted, r is 1, 2, 3 or 4 and r' is 1 or 2, s, t are each 0, 1 or 2, where 1 £s+t £3, Z is a nonmetallic element of group VA of the Periodic Table of the Elements, $E^1$, $E^2$ are each a nonmetallic element from group VA of the Periodic Table of the Elements, $R^1$ to $R^4$ are each, independently of one another, linear or branched $C_1$–$C_{20}$-alkyl, $C_3$–$C_{14}$-cycloalkyl, $C_6$–$C_{14}$-aryl or alkylaryl having from 1 to 20 carbon atones in the alkyl part and from 6 to 14 carbon atoms in the aryl part, where at least one of the radicals $R^1$ to $R^4$ bears at least one hydroxy, amino or acid group or contains an ionic functional group, b) a dispersant and c) optionally an organic hydroxy compound, wherein the copolymerization is cared out in the presence of a water-soluble macromolecular host compound which has a hydrophobic cavity and a hydrophilic shell.

4. A process as claimed in claim 3, wherein the copolymerization is carried out in the presence of a1.1) a metal M selected from the group consisting of groups VIIIB, IB or IIB of the Periodic Table of the Elements, which is present in salt form or as a complex salt, a1.2) a chelating ligand of the formula (III), and a2) an acid.

5. A process as claimed in claim 2 or 4, wherein the acid is a Lewis acid selected from the group consisting of boron trifluoride, antimony pentafluoride and triarylboranes or a protic acid selected from the group consisting of sulfiic acid, poluenesulfonic acid, tetrafluoroboric acid, trifluoromemanesidfonic acid, perchloric acid and trifluoroacetic acid.

6. A process as claimed in any of claims 1 to 3, wherein the radicals $R^1$ to $R^4$ are linear, branched or carbocycle-containing $C_2$–$C_{20}$-alkyl units, $C_3$–$C_{14}$-cycloalkyl units, $C_6$–$C_{14}$-aryl units or alkylaryl units having from 1 to 20 carbon atoms in the alkyl part and from 6 to 14 carbon atoms in the aryl part, and at least one of the radicals $R^1$ to $R^4$ bears at least one hydroxy, amino, carboxylic acid, phosphoric acid, ammonium or sulfonic acid groups.

7. A process as claimed in any of claims 1 to 3, wherein the radicals $R^1$ to $R^4$ are linear, branched or carbocycle-containing $C_2$–$C_{20}$-alkyl units, $C_3$–$C_{14}$-cycloalkyl units, $C_6$–$C_{14}$-aryl units or alkylaryl units having from 1 to 20 carbon atoms in the alkyl part and from 6 to 14 carbon atoms in the aryl part, and at least one of the radicals $R^1$ to $R^4$ is substituted by at least one free carboxylic acid or sulfonic acid group.

8. A process as claimed in any of claims 1 to 4, wherein the olefinically unsaturated compound having from 2 to 20 carbon atoms is used in admixture with a compound comprising the structural element of the formula (V)

  (V), where

Q is a nonpolar organic group selected from the group consisting of linear or branched $C_1$–$C_{20}$-alkyl, $C_3$–$C_{14}$-cycloalkyl, $C_6$–$C_{14}$-aryl and alkylaryl having from 1 to 20 carbon atoms in the alkyl part and from 6 to 14 carbon atoms in the aryl part, and p is a positive integer, from 1–4, and Pol is a polar group selected from the group consisting of
carboxyl, sulfonyl, sulfate, phosphonyl, phosphate and their alkali metal, alkaline earth metal and/or ammonium salts,
alkanolammonium, pyridinium, imidazolinium, oxazolinium, morpholinium, thiazolinum, quinolinium, isoquinolinium, tropylium, sulfonium, guanidinium and phosphonium compounds and ammonium compounds of the formula (VI)

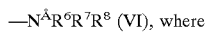 (VI), where $R^6$, $R^7$ and $R^8$ are each, independently of one another, hydrogen or linear or branched $C_1$–$C_{20}$-alkyl, or a group of the formula (VII), (VIII) or (IX)

 (VII),

 (VIII),

 (IX), where

EO is a —$CH_2$—$CH_2$—O— group,

PO is a —$CH_2$—$CH(CH_3)$—O— or a —$CH(CH_3)$—$CH_2$—O— group, k and l are each from 0 to 50, but k and l are not simultaneously 0, and $R^9$ is hydrogen or linear or branched $C_1$–$C_{20}$-alkyl or —$SO_3H$ or a alkali metal, alkaline earth metal or ammonium salt thereof.

9. A process as claimed in claim 8, wherein the compound comprising the structural element of the formula (V) which is used is a α-olefin of the formula (X)

 (X).

10. A process as claimed in any of claims 1 to 4, wherein the dispersant b) is an anionic, cationic and/or nonionic emulsifier.

11. A process as claimed in any of claims 1 to 4, wherein the hydroxy compound c) is a monohydric or polyhydric alcohol and/or a sugar.

12. A process as claimed in any of claims 1 to 4, wherein the water-soluble macromolecular host compounds used are cyclic oligosaccharides, noncyclic oligosaccharides and/or derivatives thereof.

13. A process as claimed in claim 12, wherein the cyclic oligosaccharides are α-, β- and/or γ-cyclodextrins and the noncyclic oligosaccharides are starches and/or starch degradation products.

14. A process as claimed in claim 13, wherein the starch degradation products are hydrolytically degraded starches having a molecular weight of from 1000 to 30000 g/mol.

15. An aqueous copolymer system prepared by a process as claimed in any of claims 1 to 4.

16. An aqueous copolymer system as claimed in claim 15, which comprises an adhesive binder, a sealing composition, a polymer-based plaster, a coating, a render, a nonwoven, a protective layer, a water vapor barrier, a primer, a mineral binder or a synthetic polymer.

* * * * *